(12) United States Patent
Seto et al.

(10) Patent No.: US 9,281,014 B2
(45) Date of Patent: Mar. 8, 2016

(54) IMAGE PROCESSING APPARATUS AND COMPUTER PROGRAM

(71) Applicant: Panasonic Corporation, Osaka (JP)

(72) Inventors: Akira Seto, Osaka (JP); Yoshinori Okazaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 9 days.

(21) Appl. No.: 14/152,359

(22) Filed: Jan. 10, 2014

(65) Prior Publication Data

US 2014/0126882 A1     May 8, 2014

Related U.S. Application Data

(63) Continuation of application No. PCT/JP2013/001100, filed on Feb. 26, 2013.

(30) Foreign Application Priority Data

Mar. 28, 2012 (JP) ................................ 2012-073199

(51) Int. Cl.

| | |
|---|---|
| *H04N 9/80* | (2006.01) |
| *H04N 9/82* | (2006.01) |
| *G11B 27/10* | (2006.01) |
| *H04N 9/804* | (2006.01) |

(Continued)

(52) U.S. Cl.
CPC .............. *G11B 27/102* (2013.01); *H04N 1/212* (2013.01); *H04N 9/8042* (2013.01); *H04N 9/8227* (2013.01); *H04N 9/87* (2013.01); *H04N 5/772* (2013.01); *H04N 2101/00* (2013.01); *H04N 2201/3226* (2013.01); *H04N 2201/3273* (2013.01)

(58) Field of Classification Search
USPC .......... 386/239, 241, 243, 244, 248, 278, 282
See application file for complete search history.

(56) References Cited

U.S. PATENT DOCUMENTS

| | | | |
|---|---|---|---|
| 6,182,069 B1 * | 1/2001 | Niblack et al. | |
| 7,512,622 B2 * | 3/2009 | Volk et al. | |

(Continued)

FOREIGN PATENT DOCUMENTS

| | | | |
|---|---|---|---|
| JP | 2004-297177 A | 10/2004 | |
| JP | 2004-328041 A | 11/2004 | |

(Continued)

OTHER PUBLICATIONS

International Search Report for corresponding International Application No. PCT/JP2013/001100 mailed May 21, 2013.

(Continued)

*Primary Examiner* — Daquan Zhao
(74) *Attorney, Agent, or Firm* — Renner, Otto, Boisselle & Sklar, LLP

(57) ABSTRACT

An image processing apparatus according to an embodiment includes: an interface configured to obtain management information that has been generated along with movie data generated; and a controller configured to generate, as a representative picture representing the movie data, image information including characters or an icon to be determined by reference to the management information. When selected by a user, the representative picture is presented on a display device in order to start playing back movie data represented by the representative picture.

16 Claims, 17 Drawing Sheets

(51) Int. Cl.
*H04N 1/21* (2006.01)
*H04N 9/87* (2006.01)
*H04N 5/93* (2006.01)
*G11B 27/00* (2006.01)
*H04N 5/77* (2006.01)
*H04N 101/00* (2006.01)

(56) References Cited

U.S. PATENT DOCUMENTS

| | | | |
|---|---|---|---|
| 2004/0239769 A1 | 12/2004 | Tojo | |
| 2007/0222884 A1* | 9/2007 | Mori et al. | 348/333.05 |
| 2007/0236729 A1* | 10/2007 | Yoda | 358/1.15 |
| 2012/0019685 A1 | 1/2012 | Morioka et al. | |

FOREIGN PATENT DOCUMENTS

| | | |
|---|---|---|
| JP | 2004-336381 A | 11/2004 |
| JP | 2005-277609 A | 10/2005 |
| JP | 2007-259390 A | 10/2007 |
| JP | 2009-141426 A | 6/2009 |
| JP | 2010-016729 A | 1/2010 |
| JP | 2010-141628 A | 6/2010 |
| JP | 2011-130198 A | 6/2011 |
| JP | 2012-004713 A | 1/2012 |
| JP | 2012-178814 A | 9/2012 |
| WO | WO 2010/116715 A1 | 10/2010 |

OTHER PUBLICATIONS

Form PCT/ISA/237 for corresponding International Application No. PCT/JP2013/001100, dated May 21, 2013, with partial English translation.
Co-Pending U.S. Appl. No. 13/798,433, filed Mar 13, 2013.
Co-Pending U.S. Appl. No. 13/798,500, filed Mar 13, 2013.
Co-Pending U.S. Appl. No. 13/798,889, filed Mar 13, 2013.

* cited by examiner

FIG. 7A

| CONTENT ID | CONTENT TYPE | DIGEST MOVIE ID | REAL FILE NAME | CHAPTER INFORMATION ||| | RELATION INFORMATION ||
| --- | --- | --- | --- | --- | --- | --- | --- | --- |
| | | | | START TIME | END TIME | CHAPTER TITLE | ASSOCIATED CONTENT ID | BEFORE/AFTER INFORMATION |
| D1-P1 | Picture | D1 | D1G001.JPG | — | — | | D1-C1b<br>D1-C1a | — |
| D1-C1b | Video | D1 | DIG001.MP4 | 0:00:00 | 0:00:05 | | D1-P1 | BEFORE |
| D1-C1a | Video | D1 | DIG001.MP4 | 0:00:05 | 0:00:10 | | D1-P1 | AFTER |

(a)

(b)

(c)

(d)

(a)

(b 1)

(b 2)

(c)

IMAGE PROCESSING APPARATUS AND COMPUTER PROGRAM

This is a continuation of International Application No. PCT/JP2013/001100, with an international filing date of Feb. 26, 2013, which claims priority of Japanese Patent Application No. 2012-073199, filed on Mar. 28, 2012, the contents of which are hereby incorporated by reference.

BACKGROUND

1. Technical Field

The present disclosure relates to an electronic device which generates a representative picture for a moving picture.

2. Description of the Related Art

A known image capture device generates not only movie data based on captured image data that has been obtained by capturing a subject image but also a still picture representing the movie data (which will be referred to herein as a "thumbnail picture" or a "representative picture").

For example, Japanese Laid-Open Patent Publication No. 2010-16729 discloses a technique for giving a thumbnail picture that has been generated based on a single frame of a moving picture a mark representing a feature of the moving picture.

SUMMARY

Such a thumbnail picture representing content such as a still picture or a moving picture suitably allows the viewer to easily understand what kind of content is featured by that thumbnail picture.

The present disclosure provides an electronic device which can create information representing a more convenient thumbnail picture (which will be sometimes referred to herein as "thumbnail information") for the user.

An image processing apparatus according to an aspect of the present disclosure includes: an interface configured to obtain management information that has been generated along with movie data generated; and a controller configured to generate, as a representative picture representing the movie data, image information including characters or an icon to be determined by reference to the management information.

According to a technique of the present disclosure, a more convenient representative picture can be generated for the user.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 7A schematically illustrates an exemplary list of information to be stored in a management database.

DETAILED DESCRIPTION

Hereinafter, embodiments will be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

Embodiment 1

Figure 1:
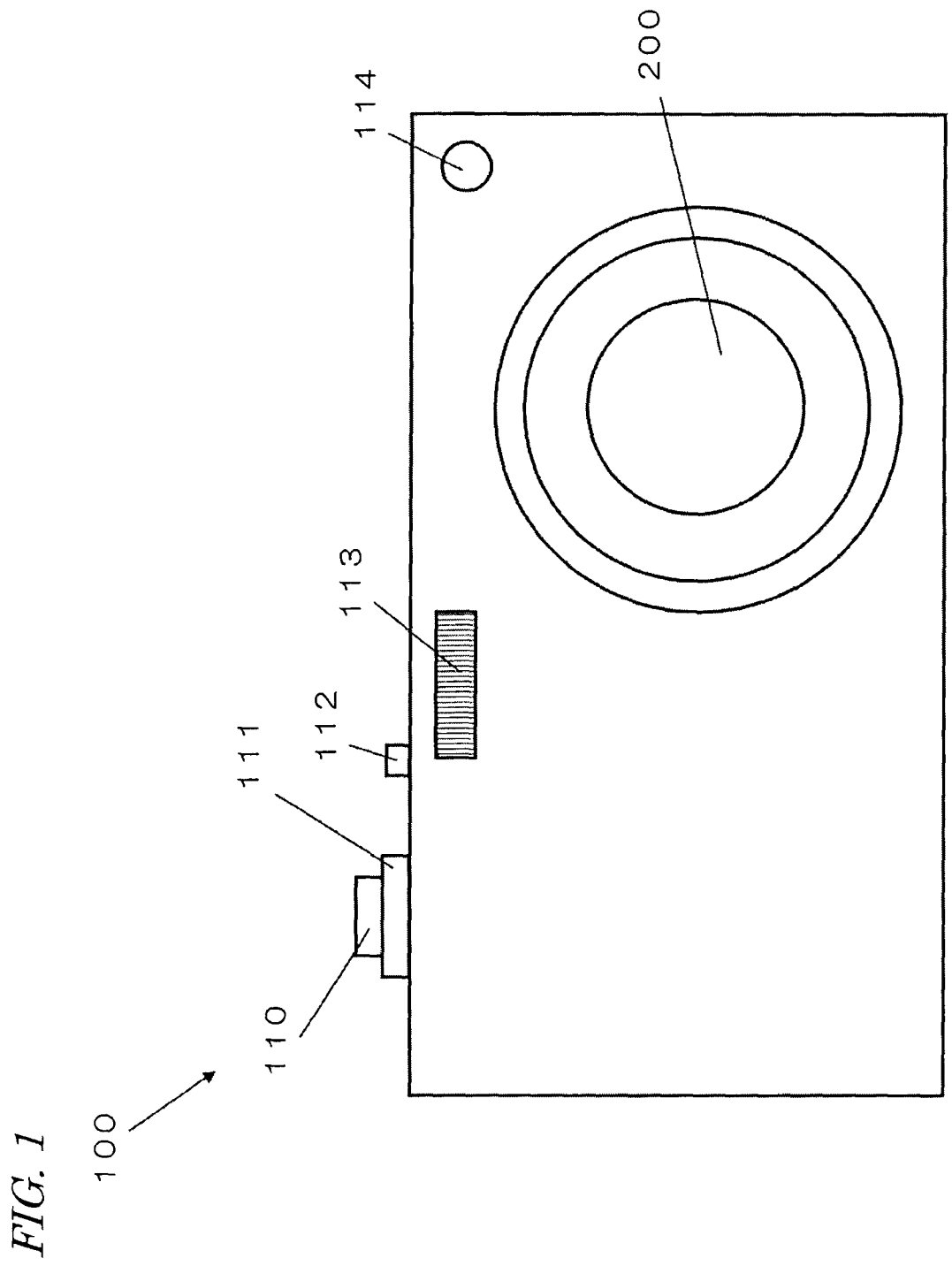
FIG. 1 is a front view of a digital camera 100.
Figure 2:
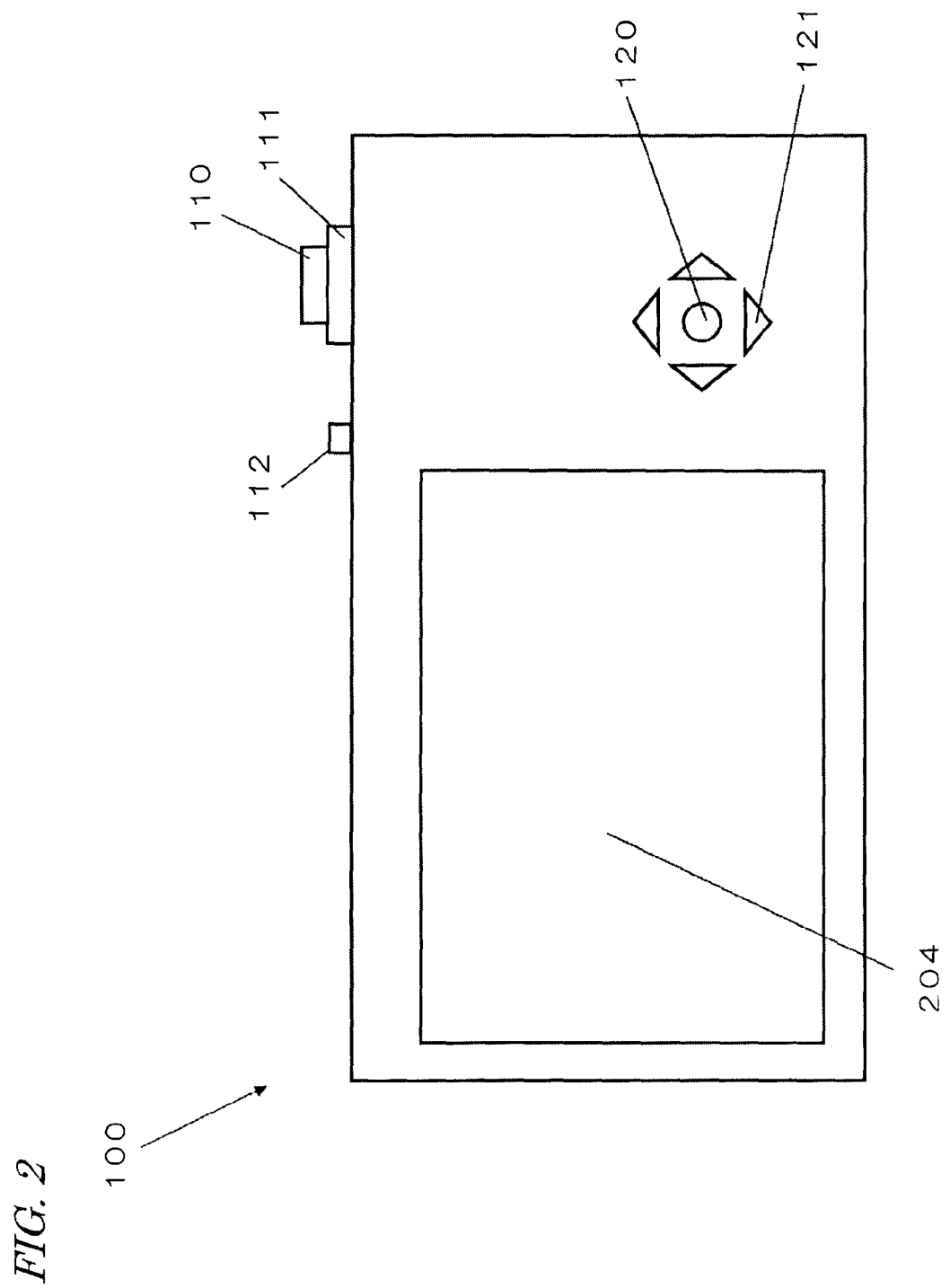
FIG. 2 is a rear view of the digital camera 100.
Figure 3:
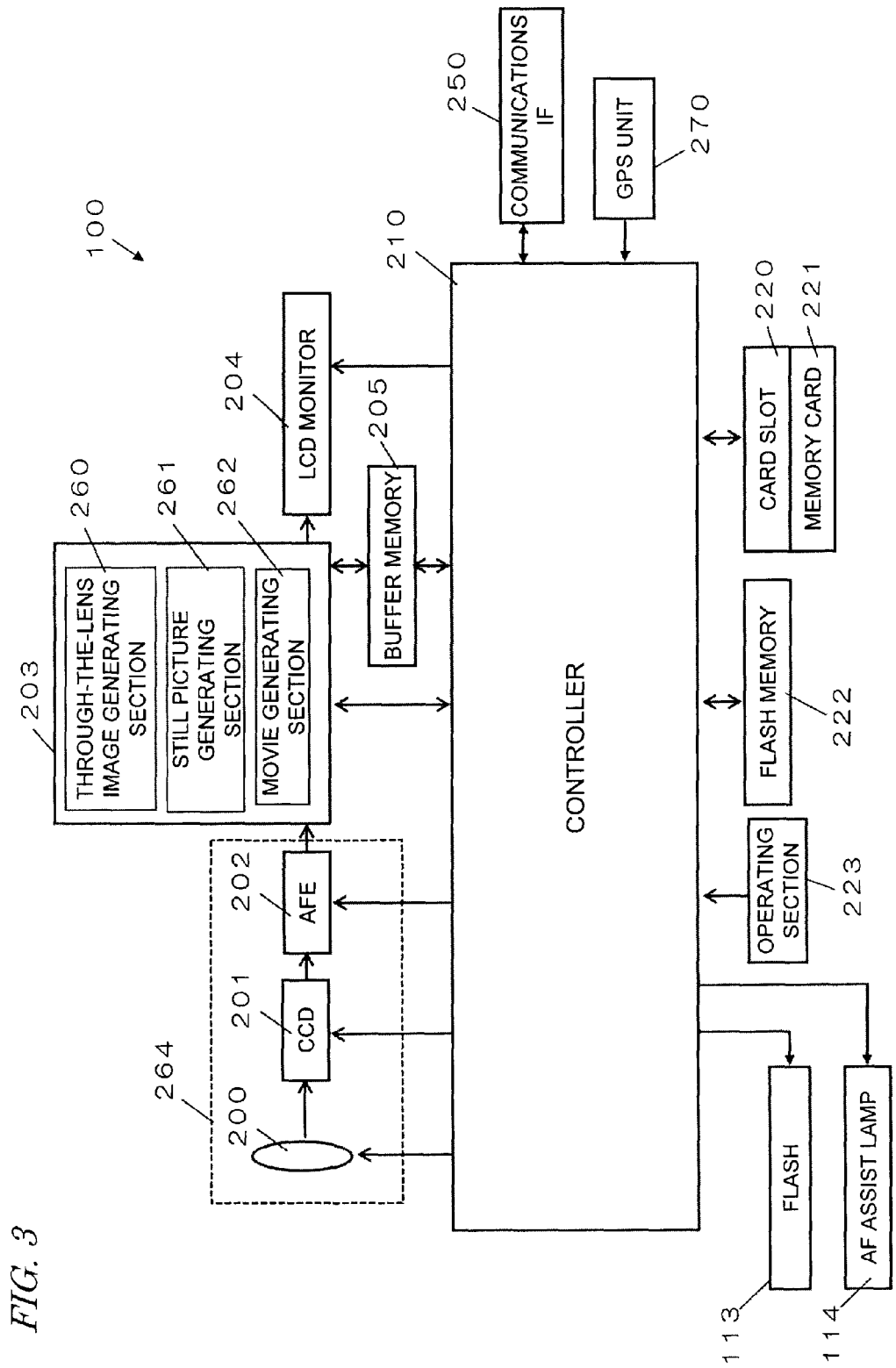
FIG. 3 is a block diagram illustrating how respective components of the digital camera 100 are electrically connected together.

FIGS. 1 and 2 are schematic representations illustrating the configuration of a digital camera (image capture device) 100 as a first embodiment on its front side and on its rear side, respectively. FIG. 3 is a block diagram generally illustrating an internal configuration for the digital camera 100.

The digital camera 100 of this embodiment has multiple modes including shooting modes, a playback mode and a setting mode. The shooting modes include a normal shooting mode and a digest movie recording mode. In the digest movie recording mode, the digital camera 100 continuously writes movie data on a buffer memory 205. And as soon as a user's instruction (e.g., an instruction to shoot a still picture that has been given by pressing a release button 110 or an instruction to record a digest movie) is received during that continuous recording, the digital camera 100 selects parts of the movie data that has been written on the buffer memory 205 for a predetermined period around the time of instruction and records those selected parts as a digest movie file. Specifically, when triggered by the instruction to shoot a still picture, the digital camera 100 writes movie data for a few seconds just before the still picture is shot, movie data for a few seconds right after the still picture has been shot, or movie data for a few seconds just before and right after the still picture has been shot on a storage medium such as a memory card 221. Alternatively, the digital camera 100 may also write movie data for a few seconds just before and/or right after an instruction to record a digest movie has been given on a storage medium such as the memory card 221 without shooting a still picture.

In this description, a single unit of movie data to be captured during the predetermined period of time (e.g., just before and right after the timing to shoot a still picture) will be referred to herein as a "chapter". Every time a chapter is recorded, a decision is made whether the chapter satisfies a predetermined condition or not. If the answer is YES, the chapter is combined with the previous chapters that have been written there so far, thus forming a single movie file to be recorded. A movie file thus formed will be referred to herein as a "digest movie file". To update such a digest movie file that has been written with the contents of a new chapter will be referred to herein as "adding" that chapter to the digest movie file. Every time a chapter is newly generated, the controller 210 of the digital camera 100 determines whether that chapter should be added to the old digest movie file or saved on a new digest movie file separately. The controller 210 saves all chapters that have been generated during a predetermined period (e.g., one day) collectively on a single digest movie file. Such a movie data writing mode will be referred to herein as a "digest movie recording mode".

According to this embodiment, the digital camera 100 operating in the digest movie recording mode may also have its modes of operation changed into a "thumbnail adding mode", in which two or more pieces of thumbnail information may be added to each single digest movie file. When the digital camera 100 is operating in the thumbnail adding mode, thumbnail information may be generated and written on a chapter-by-chapter basis.

By reference to management information which is generated during shooting in association with a chapter generated, the digital camera 100 of this embodiment generates thumbnail information representing a still picture (thumbnail picture) about a digest movie to which the chapter is added and writes the thumbnail information on a storage medium. As a result, thumbnail information which is more convenient for the user can be generated.

Hereinafter, the configuration and operation of the digital camera 100 will be described more specifically.

[1-1. Configuration]

First of all, the configuration of the digital camera 100 of this embodiment will be described with reference to FIGS. 1 through 3.

As shown in FIG. 1, the digital camera 100 includes a lens barrel to house an optical system 200 in, a flash 113, and an AF (autofocus) assist lamp 114 on its front side. The digital camera 100 also includes a release button 110, a zoom lever 111 and a power button 112, on the top.

As shown in FIG. 2, the digital camera 100 includes an LCD monitor 204, a menu button 120 and cross buttons 121, on its rear side. In this description, those members that accept the user's instruction, including the release button 110, the zoom lever 111, the power button 12, the menu button 120 and the cross buttons 121, will be collectively referred to herein as an "operating section".

FIG. 3 illustrates how respective components of this digital camera 100 are electrically connected together. The digital camera 100 includes an image capturing section 264, an image processing section 203, an LCD monitor 204, a buffer memory 205, a controller 210, a flash (strobe light source) 113, an AF assist lamp 114, an operating section 223, a flash memory 222, a card slot 220, a communications interface (IF) 250, and a GPS unit 270. The image capturing section 264 includes an optical system 200, a CCD image sensor 201, and an AFE (analog front end) 202. The image processing section 203 includes a through-the-lens image generating section 260, a still picture generating section 261, and a movie generating section 262. Although the memory card 221 is illustrated in FIG. 3, the memory card 221 does not form part of this digital camera 100 but is a removable storage medium which is connectible to the card slot 220.

The digital camera 100 makes the CCD image sensor 201 convert into an electrical signal (i.e., capture) the subject image that has been produced through the optical system 200. Then, the CCD image sensor 201 generates captured image data based on the subject image that has been produced on the image capturing plane. The captured image data thus generated is subjected to various kinds of processing by the AFE 202 and the image processing section 203 to be image data. The image data thus generated is then written on storage media including the flash memory 222 and the memory card 221. And an image represented by the image data that has been written on the flash memory 222 and the memory card 221 is displayed on the LCD monitor 204 in accordance with the instruction given by the user who is operating this digital camera 100 using the operating section 223.

Hereinafter, the respective components of the digital camera 100 shown in FIGS. 1 to 3 will be described in detail one by one.

The optical system 200 includes a focus lens, a zoom lens, a diaphragm and a shutter. Optionally, the optical system 200 may further include an OIS (optical image stabilizer) lens as well to cancel a camera shake optically. It should be noted that this optical system 200 may include any other number of lenses and may be made up of any number of groups of lenses. The focus lens, the zoom lens, the diaphragm, and the shutter are driven by their associated drivers (such as a DC motor or a stepping motor) in accordance with a control signal supplied from the controller 210.

The CCD image sensor 201 is an imager which generates captured image data based on the subject image that has been produced by the optical system 200. The CCD image sensor 201 generates image data for a new frame at regular time intervals. Also, the CCD image sensor 201 adjusts the degree of exposure by performing an electronic shuttering operation. Optionally, any other type of image sensor such as a CMOS image sensor or an NMOS image sensor may be used instead of the CCD image sensor 201.

The AFE 202 is connected to the CCD image sensor 201 and subjects the captured image data, which has been generated by the CCD image sensor 201, to correlated double sampling, gain control, and other kinds of processing. Also, the AFE 202 converts the analog captured image data into digital captured image data and then outputs the captured image data thus converted to the image processing section 203.

The image processing section 203 is connected to the AFE 202, receives the captured image data from the AFE 202 and subjects the captured image data to various kinds of processing, thereby generating image data. Examples of those various kinds of processing include gamma correction, white balance correction, luminance and color difference (YC) conversion, electronic (or digital) zooming, compression and expansion. However, these are just examples. Based on the captured image data provided by the AFE 202, the image processing section 203 can extract the feature point of a particular subject from an image area specified by the captured image data and can make a decision on the subject. For example, if the feature point of some person's face is added to a list in advance, then the image processing section 203 can recognize that person's face.

The image processing section 203 may be implemented as a digest signal processor (DSP) or a microcontroller, for example. The image processing section 203 may be implemented as either only a set of hardware circuits or a combination of hardware and software (computer program). The image processing section 203 includes a through-the-lens image generating section 260, a still picture generating section 261, a movie generating section 262 and other image generating sections.

The through-the-lens image generating section 260 generates image data to be displayed on the LCD monitor 204 based on the captured image data provided sequentially by the AFE 202 (at a rate of 60 frames per second, for example). Looking at the real-time video displayed on the LCD monitor 204, the user can determine easily the angle of view of shooting and other parameters.

Based on the captured image data obtained at the timing when the release button 110 is pressed down, the still picture generating section 261 generates a still picture to be recorded. The still picture generating section 261 generates a still picture file compliant with the JPEG standard, for example. In generating a still picture file, the still picture generating section 261 adds management information about the still picture to that file. Examples of the management information includes the date and time of shooting, an F value, a shutter speed, sensitivity, GPS information, information about the shooting mode, and information specifying a shooting condition such as information indicating whether a particular subject is included or not. The still picture file that has been generated by the still picture generating section 261 is written by the controller 210 on the memory card 221. In this case, the information about the shooting mode is information indicating a particular mode such as Travel mode or Baby mode, which will be described in detail later. In writing the still picture file on the memory card 221 in the digest movie recording mode, the controller 210 adds information about the still picture file to a management database. The management database is a database which stores information about an association between still pictures and movies (chapters) that form the digest movie. The management database will be described in detail later.

The movie generating section 262 generates movie data based on the captured image data supplied from the image capturing section 264. Based on the captured image data obtained between a point in time when a movie recording button (not shown) included in the operating section 223 was pressed down and a point in time when the movie recording button is pressed down again to stop recording, the movie generating section 262 generates a movie file to be written. The movie generating section 262 generates a movie file compliant with the AVCHD™ standard or the MP4 standard, for example. In generating a movie file, the movie generating section 262 adds management information about the movie to that file. Examples of this management information also includes the date and time of shooting, an F value, a shutter speed, sensitivity, GPS information, information about the shooting mode, and information indicating whether a particular subject is included or not. The movie file thus generated is written by the controller 210 on the memory card 221.

In addition, in the digest movie recording mode, the movie generating section 262 continuously generates movie data based on the captured image data and writes the data on the buffer memory 205. And based on the captured image data that has been obtained in a predetermined period around the timing when the release button 110 is pressed down (which will be sometimes referred to herein as "release timing"), the movie generating section 262 generates movie data (chapters). The predetermined period may be just before and right after the release timing, for example. The data of the chapters thus generated is saved by the controller 210 in a digest movie file that has been recorded on the memory card 221. If no digest movie file to which the chapters thus generated need to be added has been recorded on the memory card 221 yet, then the controller 210 newly creates a digest movie file in the memory card 221 and saves the chapters generated in that digest movie file. In saving the chapters in the digest movie file, the movie generating section 262 also saves management information about the chapters in the digest movie file. Examples of this management information also includes the date and time of shooting, an F value, a shutter speed, sensitivity, GPS information, information about the shooting mode, and information indicating whether a particular subject is included or not. In adding the chapters to the digest movie file in the memory card 221, the controller 210 adds information about the chapters to the management database.

In the digest movie recording mode, the still picture generating section 261 generates a still picture file based on the captured image data obtained when the release button 110 is pressed down. The controller 210 writes the still picture file thus generated on the memory card 221. In the meantime, based on the captured image data obtained in a predetermined period around the timing when the release button 110 is pressed down (e.g., for a few seconds just before and right after the release timing), the movie generating section 262 generates movie data (chapters). The controller 210 adds the chapters thus generated to the digest movie file and writes them on the memory card 221. Also, the controller 210 associates the still picture file, the chapter, and the digest movie file to which the chapter has been added with each other if those files and chapter have been generated at substantially the same time, and writes them on the memory card 221. Specifically, by reference to the management database, the controller 210 associates the still picture file, the chapter, and the digest movie file to which the chapter has been added with each other if they have been generated at substantially the same time.

The LCD monitor 204 is arranged at the rear of this digital camera 100 and displays an image based on the image data that has been processed by the image processing section 203. The LCD monitor 204 may display not only an image but also various kinds of settings of this digital camera 100. The LCD monitor 204 may be replaced with an organic EL display or any other kind of display.

The controller 210 is a processor that controls the overall operation of this digital camera 100, and is suitably implemented as a combination of a ROM (read-only memory) to store a program and other sorts of information and a CPU (central processing unit) to process the program and other information. The ROM stores programs about an autofocus (AF) control and an autoexposure (AE) control and a program to control the overall operation of this digital camera 100.

The controller 210 may be implemented as a hardwired electronic circuit or a microcontroller, for example. Or the controller 210 and the image processing section 203 may form a single semiconductor chip. Also, the ROM does not have to be one of the internal components of the controller 210 but may also be provided outside of the controller 210 as well. As shown in FIG. 3, the controller 210 is electrically connected to the other components and controls those components with control signals.

The controller 210 can perform an AF control. First of all, the controller 210 obtains a contrast value in a particular subject area of the image data from the image processing section 203. By obtaining such contrast values continuously, the controller 210 senses the focusing state in a particular subject area and drives the focus lens so as to focus on that subject area. The timing for the controller 210 to carry out the AF control may be the time when the user's instruction given by pressing the release button 110 halfway through is accepted. Alternatively, the controller 210 may also be configured to carry out the AF control continuously throughout the shooting mode. Information about the focusing state while a still picture is being shot may be managed as management information in the still picture file and in the digest movie file.

The controller 210 can also perform an autoexposure (AE) control. First of all, the controller 210 obtains luminance information in a particular subject area of the image data from the image processing section 203. In order to get an appropriate exposure of the subject, the controller 210 calculates exposure values based on pieces of luminance information that have been obtained continuously. Based on the exposure values calculated and a predetermined program diagram, the controller 210 determines an F value and a shutter speed. The program diagram is information that defines a relation between the exposure value, the F value, and the shutter speed and is stored in advance in a storage medium such as a ROM. By monitoring the luminance information to be obtained from the image data, the controller 210 performs the AE control continuously. The exposure value for shooting may be fixed either when the release button 110 is pressed halfway by the user or when the release button 110 is pressed fully by him or her. The F value, shutter speed, sensitivity and other kinds of information to be relied on when a still picture is going to be shot may be managed as management information in the still picture file and in digest movie file.

The buffer memory 205 is a storage medium that functions as a work memory for the image processing section 203 and the controller 210 and may be implemented as a DRAM (dynamic random access memory), for example. Meanwhile, the flash memory 222 functions as an internal memory to store the image data and other kinds of information.

The card slot 220 is an interface, to/from which the memory card 221 is readily insertable and removable, and can be connected to the memory card 221 both electrically and mechanically. Optionally, the card slot 220 may have the ability to control the memory card 221.

The memory card 221 is an external memory with an internal storage medium such as a flash memory, and can store data such as the image data to be processed by the image processing section 203. In this embodiment, the memory card 221 is supposed to be used as an exemplary external memory. However, this is only an example. Alternatively, the external memory may also be a storage medium such as a hard disk or an optical disc.

The operating section 223 is a generic term that refers collectively to a number of operating buttons and dials that are arranged on the outer shell of this digital camera 100, and functions as a user interface that accepts the user's instructions. Specifically, the operating section 223 includes the release button 110, the zoom lever 111, the power button 112, the menu button 120 and the cross buttons 121 shown in FIGS. 1 and 2. On accepting the user's instruction, the operating section 223 sends various operation instruction signals to the controller 210.

The release button 110 is a two-stage press button that can be pressed down halfway and fully by the user. Specifically, when the release button 110 is pressed halfway by the user, the controller 210 performs the autofocus (AF) control and the autoexposure (AE) control described above, thereby determining the shooting condition. And when the release button 110 is pressed down fully by the user, the controller 210 writes the image data, (which may be a still picture or a chapter and) which has been captured and generated when the button is pressed down fully, on the memory card 221.

The menu button 120 is another press button. When the menu button 120 is pressed by the user, the controller 210 gets a menu displayed on the LCD monitor 204. The menu is displayed on the screen to allow the user to determine the settings of the shooting and playback conditions. The menu button 120 may also function as an ENTER button so that if the menu button 120 is pressed while the user is choosing one of the options of any of various condition setting items, that option is selected.

The cross buttons 121 are yet another set of press buttons, which are arranged over, under, and on the right and left of the menu button 120. By pressing any of these cross buttons 121, the user can choose one of the options of any of the various condition setting items that are being displayed on the LCD monitor 204.

The flash 113 includes a xenon tube, a capacitor, a booster, and a firing trigger circuit. In accordance with a control signal supplied from the controller 210, the booster applies a high voltage to the capacitor. Also in accordance with a control signal supplied from the controller 210, the firing trigger circuit discharges the high voltage that has been applied to, and stored in, the capacitor, thereby instantaneously emitting flash light from the xenon gas in the xenon tube synchronously with acceptance of the instruction to shoot a still picture. As a result, the digital camera 100 can shoot a still picture of the subject irradiated with the flashlight. By firing the flash 113 instantaneously with respect to the subject, the subject can be shot with the lack of brightness compensated for. Information indicating whether the flash has been fired or not while a still picture is being shot may be managed as management information in the still picture file and in the digest movie file.

The AF assist lamp 114 emits an AF assist light beam in order to compensate for the lack of illuminance of the subject and obtain the subject's contrast value while the controller 210 is performing the AF control described above. Particularly when the subject has low illuminance, it is difficult to obtain an AF controllable contrast value from the subject. With the AF assist light beam, however, the controller 210 can obtain an AF controllable contrast value in an increased number of scenes. Information indicating whether the AF assist light beam has been emitted or not during the AF control may be managed as management information in the still picture file and in the digest movie file.

The communications interface 250 is a wireless or wired communications interface. Through this communications interface 250, the controller 210 can be connected to other communications devices via an access pointer. The communications interface 250 may be implemented as a wireless LAN or a wired LAN, for example.

The GPS unit 270 is a GPS receiver which detects the current location of the digital camera 100 using the global positioning system by satellite. The controller 210 obtains information about the current location (including the latitude and the longitude) via the GPS unit 270. The digital camera 100 can associate the current location information provided by the GPS unit 270 with the image shot (which may be either a still picture or a movie such as a chapter). Information about the current location while a still picture is being shot may be managed as management information in the still picture file and in the digest movie file.

It should be noted that the configuration described above is only an example and any other configuration could be adopted as well as long as the controller 210 can perform the operation to be described below. For example, the digital camera 100 may include some additional components other than the ones shown in FIG. 3 or may have some of its components omitted.

[1-2. Operation]

Hereinafter, it will be described with reference to FIGS. 4 through 15 exactly how this digital camera 100 operates.

First of all, it will be outlined how to perform a digest movie writing operation. In the following example, in response to an instruction to shoot a still picture, a movie is supposed to be recorded as chapters for a few seconds each before and after the timing when that instruction is issued.

Figure 4:
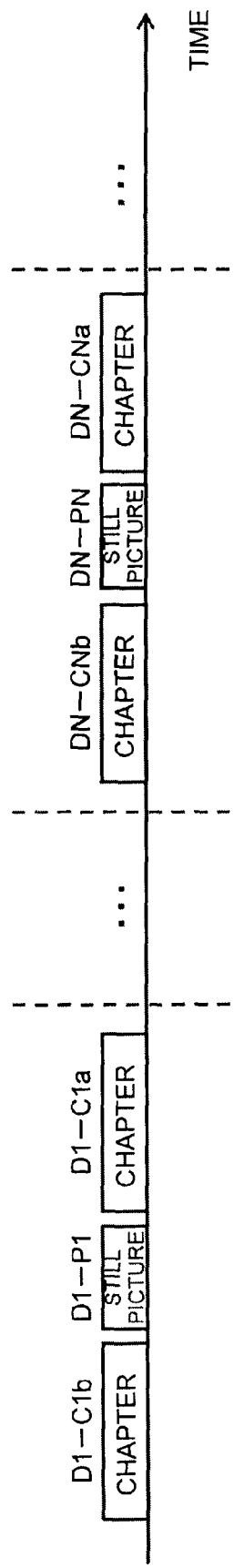
FIG. 4 generally illustrates how to record a digest movie.

FIG. 4 illustrates conceptually a series of still pictures and chapters, which have been recorded in response to an instruction to shoot a still picture as a trigger and which are arranged time sequentially on the time axis. As shown in FIG. 4, there are two chapters just before and right after each still picture. In this example, an $N^{th}$ (where N is a natural number) digest movie will be identified herein by DN, the chapters just before and right after the $N^{th}$ still picture has been shot will be identified herein by DN-CNb and DN-CNa, respectively, and the $N^{th}$ still picture will be identified herein by DN-PN. Thus, the first digest movie is identified herein by D1, for example. In that case, the chapters just before and right after the first still picture has been shot are identified herein by D1-C1b and D1-C1a, respectively, and the still picture shot at this time is identified herein by D1-P1.

As can be seen, in the digest movie recording mode, this digital camera 100 writes a still picture and chapters just before and right after the still picture on the memory card 221 one after another.

[1-2-1. Configuration of Digest Movie Menu]

Figure 5:
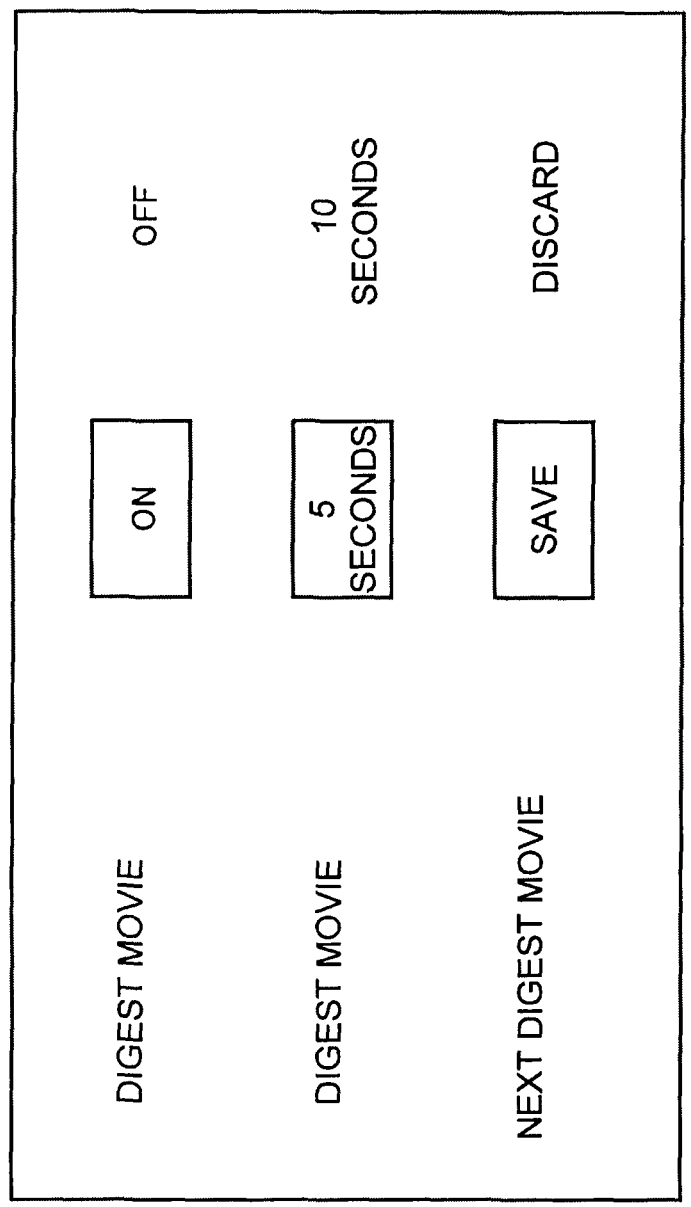
FIG. 5 illustrates generally how the digest movie setting menu looks.

FIG. 5 illustrates generally how the digest movie menu looks. In the digital camera 100 of this embodiment, when the user operates the operating section 223, a digest movie menu such as the one shown in FIG. 5 may be displayed on the LCD monitor 204.

As shown in FIG. 5, the digest movie menu includes three items that allow the user to decide whether or not he or she'd like to record the digest movie (ON/OFF), how long the chapters to generate should be (e.g., 5 seconds or 10 seconds), and whether or not the movie right after an instruction to record a still picture has been accepted should be generated as a chapter (save or discard). Optionally, the digest movie menu may further include another item that allows the user to decide whether or not the movie just before an instruction to record a still picture has been accepted should be generated as a chapter (save or discard). By operating the operating section 223, the user can choose any of these options of each item.

In the example to be described below, the user's preference as to whether or not to record the digest movie is supposed to be "ON", his or her preference as to how long the chapters to generate should be is supposed to be "5 seconds", and his or her preference as to whether or not the movie right after the instruction to record a still picture has been accepted should be generated as a chapter is supposed to be "save".

[1-2-2. Format of Digest Movie Management Information]

Figure 6:
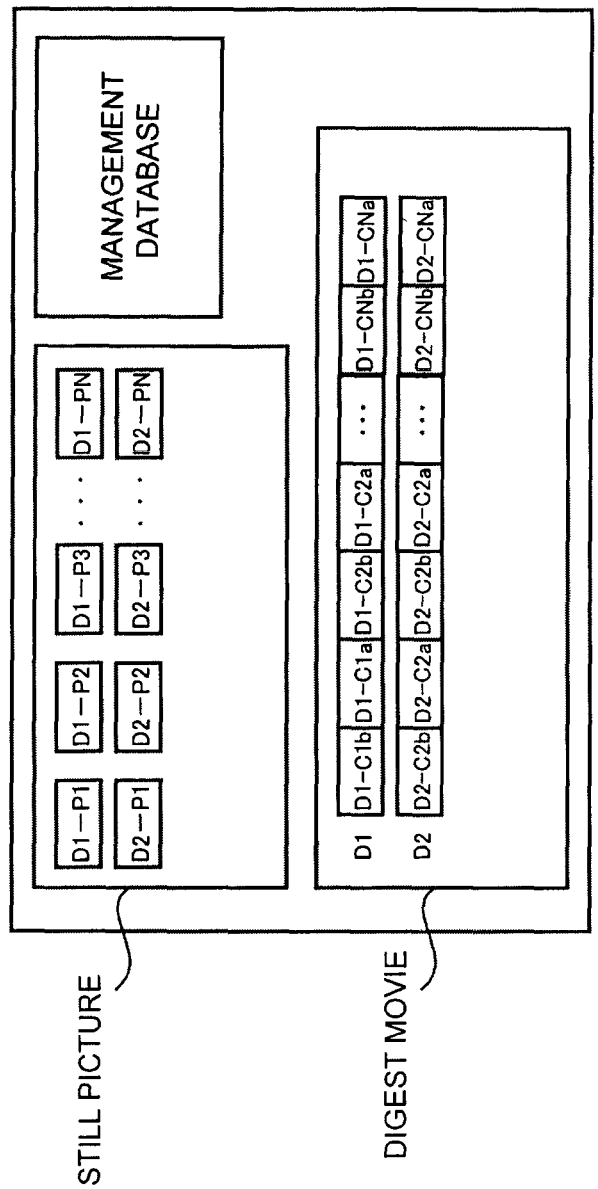
FIG. 6 illustrates the format of data stored in a memory card.

Next, the format of data to be written on the memory card 221 in the digest movie recording mode will be described with reference to FIG. 6, which illustrates conceptually the format of data to be written on the memory card 221.

A still picture, a digest movie and a management database are written on the memory card 221. In the management database, managed is information about the relation between the still picture and the chapters that have been generated just before and right after the still picture (which will be referred to herein as "relation information"). By reference to the management database, the controller 210 can see what still picture has been written on the memory card 221 and what chapters have been written in association with the still picture.

FIG. 7A illustrates a list of information to be managed in the management database. As shown in FIG. 7A, the management database includes content IDs, content types, digest movie IDs, real file names, chapter information (including the start time, end time and title of the chapter), and relation information (including the ID of associated content and information about chapters before and after the still picture). Even though still pictures and chapters that form a digest movie are supposed to be managed in this embodiment by using such a management database, these pieces of information may also be managed in the header section of each content data (including Exif and user data area) instead of using such a management database.

The content ID is a unique identifier to be given to each content (which may be a still picture or chapter). The content type is a piece of information indicating whether each content is a still picture (picture) or a movie (video). The digest movie ID is the ID of the digest movie in which each chapter is saved. The real file name is the name of the real file that includes each content. The chapter information includes the title of each chapter and the start time and end time in the digest movie. The relation information is information about the correlation between a still picture and chapters that have been generated with the still picture. The relation information includes the associated content ID and information about the chapters before and after the still picture. The associated content ID is the content ID of the associated chapter in the case of a still picture or the content ID of the associated still picture in the case of a chapter. The information about the chapters before and after the still picture is a piece of information indicating whether the chapter is just before or right after the timing of shutter release.

Figure 7B:
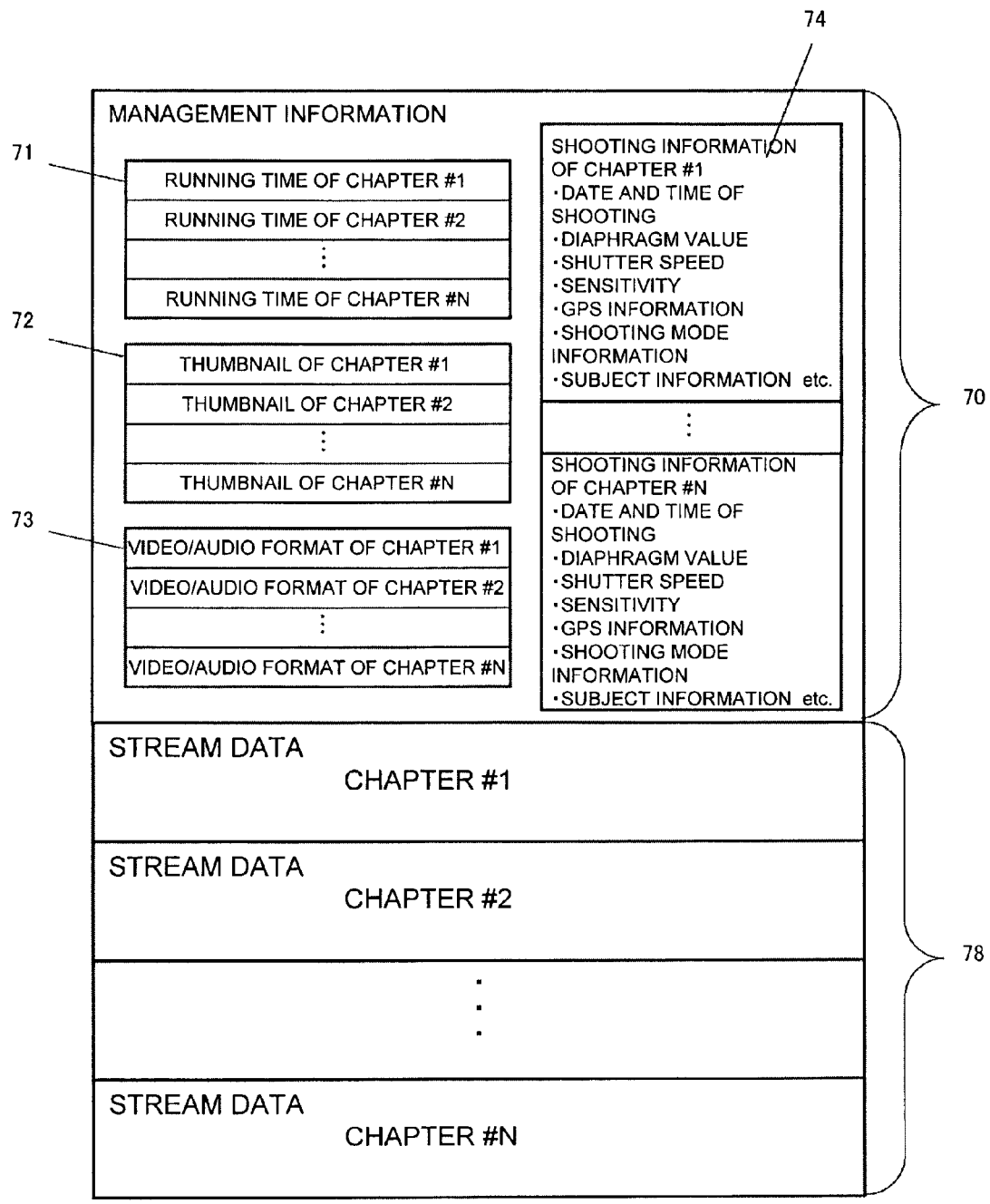
FIG. 7B schematically illustrates an exemplary arrangement of pieces of information to be stored in a digest movie file.

FIG. 7B schematically illustrates an exemplary format for a digest movie file, which includes a management information storage section 70 and a stream data storage section 78. The management information storage section 70 stores, on a chapter by chapter basis, the running time 71, thumbnail information 72, video and audio recording format information 73, and shooting information 74 (including the date and time of shooting, an F value, a shutter speed, sensitivity, GPS information, information about the shooting mode, and information indicating whether or not a particular subject is included). The stream data storage section 78 stores chapters (i.e., movie data including video and audio recorded).

[1-2-3. Digest Movie Recording Operation]

Hereinafter, it will be described how to record a digest movie.

Figure 8:
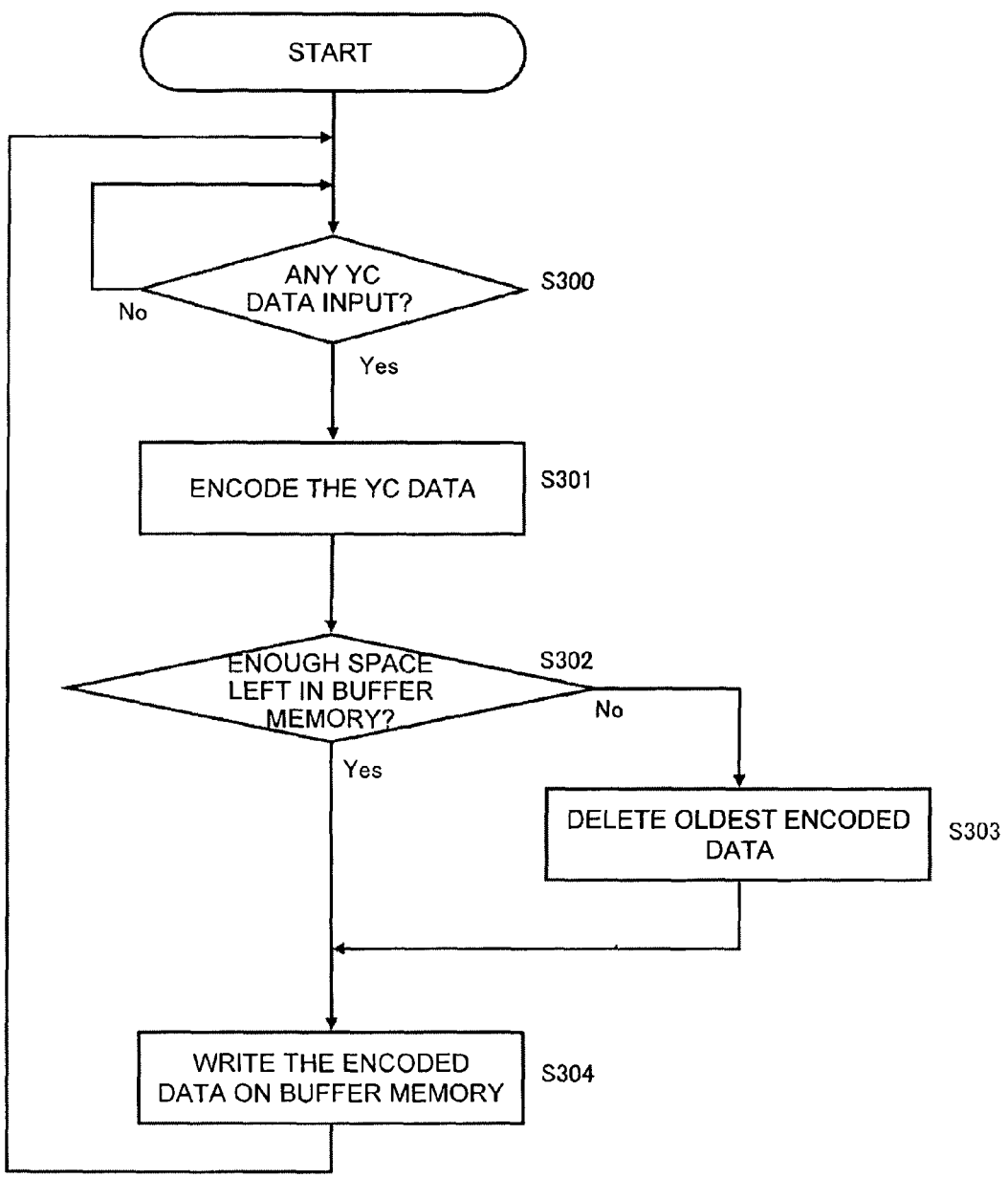
FIG. 8 is a flowchart showing the procedure of movie buffering processing.

First of all, it will be described with reference to FIG. 8 how this digital camera 100 performs movie buffering. FIG. 8 is a flowchart showing the procedure of that movie buffering. In generating a chapter, the movie generating section 262 in the image processing section 203 performs movie buffering following the flow shown in FIG. 8.

If the mode of operation of this digital camera 100 is set to be the shooting mode, the CCD image sensor 201 gets the subject image that has been produced through the optical system 200 and sequentially generates captured image data. As described above, the captured image data that has been generated by the CCD image sensor 201 is subjected to the processing at the AFE 202 and then input to the image processing section 203, which subjects the given captured image data to YC conversion processing, thereby generating YC data. In general, the captured image data generated by the CCD image sensor 201 is RGB data. That is why YC conversion processing is carried out so that the RGB data is converted into data representing a luminance component Y and data representing a color difference component C.

The controller 210 always sees if the image processing section 203 has generated YC data yet (in Step S300). If no YC data has been generated yet (i.e., if the answer to the query of the processing step S300 is NO), the controller 210 waits until YC data is generated. On the other hand, if YC data has already been generated, then the controller 210 instructs the image processing section 203 to encode the YC data generated by a predetermined encoding method. In accordance with the instruction given by the controller 210, the image processing section 203 encodes the YC data generated by the predetermined encoding method, thereby generating encoded data (in Step S301). In this manner, the encoded data of a movie (chapter) is generated.

Next, using the buffer memory 205 as a ring buffer, the controller 210 writes the encoded data on the buffer memory 205. That is to say, the controller 210 determines whether or not there is at least a predetermined space left in the buffer memory 205 (in Step S302). If the space left in the buffer memory 205 is less than the predetermined value (i.e., if the answer to the query of the processing step S302 is NO), then the controller 210 deletes the oldest encoded data that has been stored in the buffer memory 205 (in Step S303). In this processing step, if the encoded data has been generated in the MPEG file format, then the encoded data is deleted on a GOP (group of pictures) basis. Next, in Step S304, the controller 210 writes the encoded data that has been generated in Step S301 on the buffer memory 205 in which there is plenty of space left now as a result of the processing step S303. On the other hand, if the space left in the buffer memory 205 is equal to or greater than the predetermined value (i.e., if the answer to the query of the processing step S302 is YES), then the controller 210 writes the encoded data that has been generated in Step S301 as it is on the buffer memory 205 (in Step S304). After that, the controller 210 performs the same series of processing steps S300 through S304 all over again.

Figure 9:
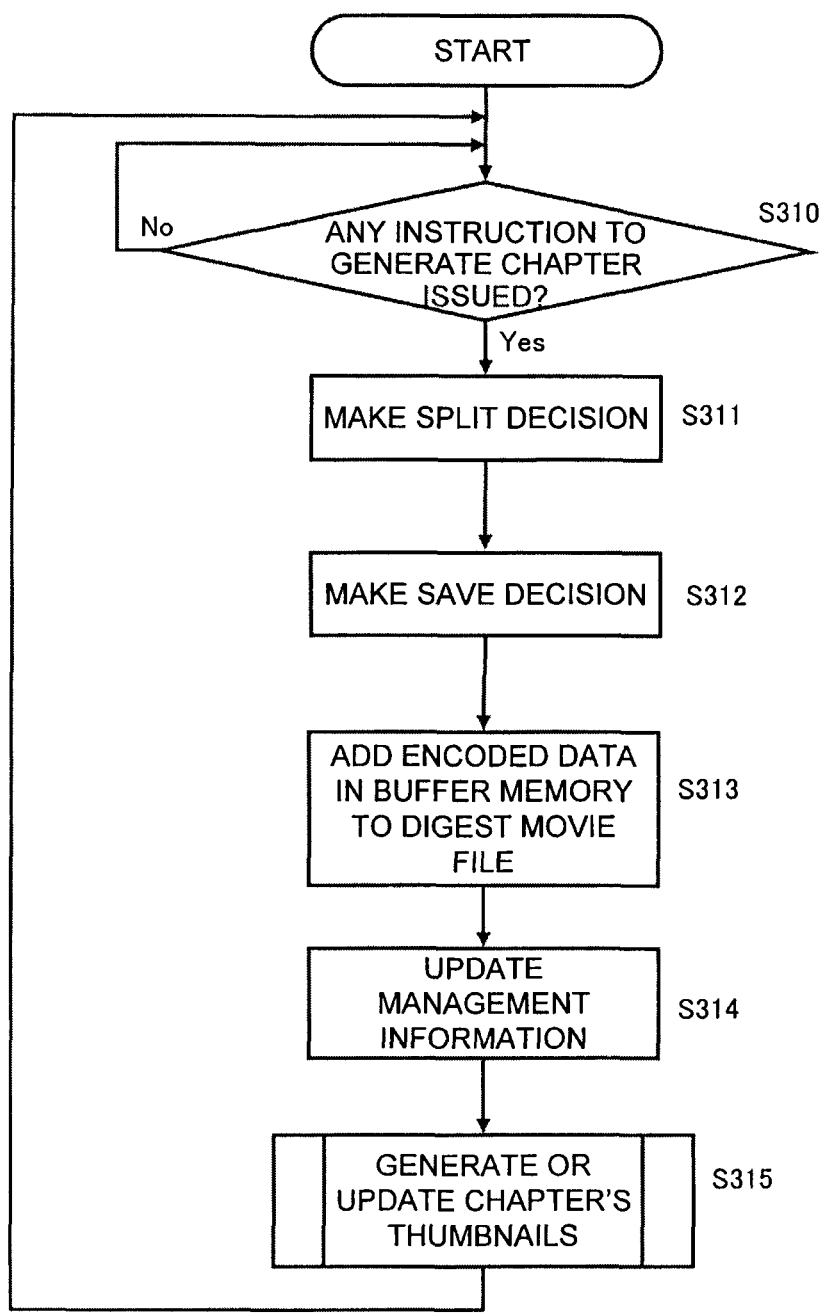
FIG. 9 is a flowchart showing the procedure in which a chapter of a digest movie is generated.

Next, it will be described with reference to FIG. 9 how to generate a movie (chapter) in accordance with an instruction to shoot a still picture. FIG. 9 is a flowchart showing the procedure in which one chapter of a digest movie is generated.

First, the controller 210 sees if any instruction to generate a chapter in accordance with an instruction to shoot a still picture has been issued (in Step S310). If any instruction to generate a chapter in response to an instruction to shoot a still picture as a trigger has been issued, the controller 210 decides whether the chapter to generate newly should be added to an existent digest movie file or a new digest movie file should be generated and the chapter should be saved there (in Step S311). Such a processing step will be referred to herein as a "split decision".

The split decision is made by determining whether or not a digest movie related to a chapter to record has been recorded on the memory card 221 yet. For example, if a digest movie file including a chapter that was generated on the same day as a chapter to generate newly has already been written on the memory card 221, then the controller 210 adds the chapter to generate newly to the existent digest movie file. On the other hand, if such a digest movie file including a chapter that was generated on the same day as a chapter to generate newly has not been written on the memory card 221 yet, then the controller 210 saves the chapter on a new digest movie file separately from the existent digest movie file. In this processing step S311, an existent digest movie file related may be found by reference to not only the date and time but also other kinds of information. For example, if there is any existent digest movie file, of which the shooting location, the subject shot or the shooting mode is either the same or similar, then the chapter newly generated may be added to that file. Optionally, when a chapter is generated, the controller 210 may prompt the user to decide whether or not he or she'd like to add that chapter to any particular existent digest movie file.

Next, the controller 210 performs save decision processing step (in Step S312), which is the processing step of determining whether or not the encoded data stored in the buffer memory 205 should be saved as a chapter. If the size of the encoded data stored in the buffer memory 205 is smaller than a predetermined value, the decision is made by the controller 210 that the encoded data stored in the buffer memory 205 should not be saved as a chapter. On the other hand, if the size of the encoded data stored in the buffer memory 205 is equal to or greater than the predetermined value, the decision is made by the controller 210 that the encoded data stored in the buffer memory 205 should be saved as a chapter. If the chapters generated were too short, a digest movie consisting of such chapters would change scenes at too short an interval for the viewer to view it comfortably. That is why the decision is made to avoid such a situation. If the decision has been made in Step S312 that the encoded data should not be saved as a chapter, then the process returns to the processing step S310 to have the controller 210 wait for the next instruction to generate a chapter to come. Optionally, the save decision processing step S312 may be performed before the split decision processing step S311. In that case, if the decision has been made that the chapter should not be saved, the controller 210 may wait for the next instruction to generate a chapter to come without making the split decision.

Next, if the decision has been made in Step S312 that the encoded data should be saved as a chapter, then the controller 210 retrieves the encoded data that is stored in the buffer memory 205 and adds it to the digest movie file (in Step S313). In this case, if the decision has been made in Step S311 that the chapter to generate newly should be added to an existent digest movie file, then the controller 210 adds the chapter to the existent digest movie file that has already been recorded on the memory card 221. On the other hand, if the decision has been made in Step S311 that another digest movie file should be newly created, then the controller 210 newly creates another digest movie file in the memory card 221 and adds the chapter to that file.

Next, the controller 210 updates the management information of the target digest movie file by adding information about the chapter that has been newly written this time to that management information (in Step S314). In this processing step S314 of updating the management information, the controller 210 updates all of the management information (such as running time) but the thumbnail information shown in FIG. 7B.

Subsequently, the controller 210 either generates or updates thumbnail information about the chapter that has been newly written this time (in Step S315). In this example, the thumbnail information 72 that is stored in the management information storage section 70 shown in FIG. 7B is either generated or updated.

[1-2-4. Generation or Update of Thumbnail Information]

Hereinafter, the processing step S315 of generating or updating the thumbnail information of a chapter will be described with reference to FIG. 10, which is a flowchart generally showing the procedure in which the digital camera 100 of this embodiment generates or updates the thumbnail information of a digest movie.

Figure 10:
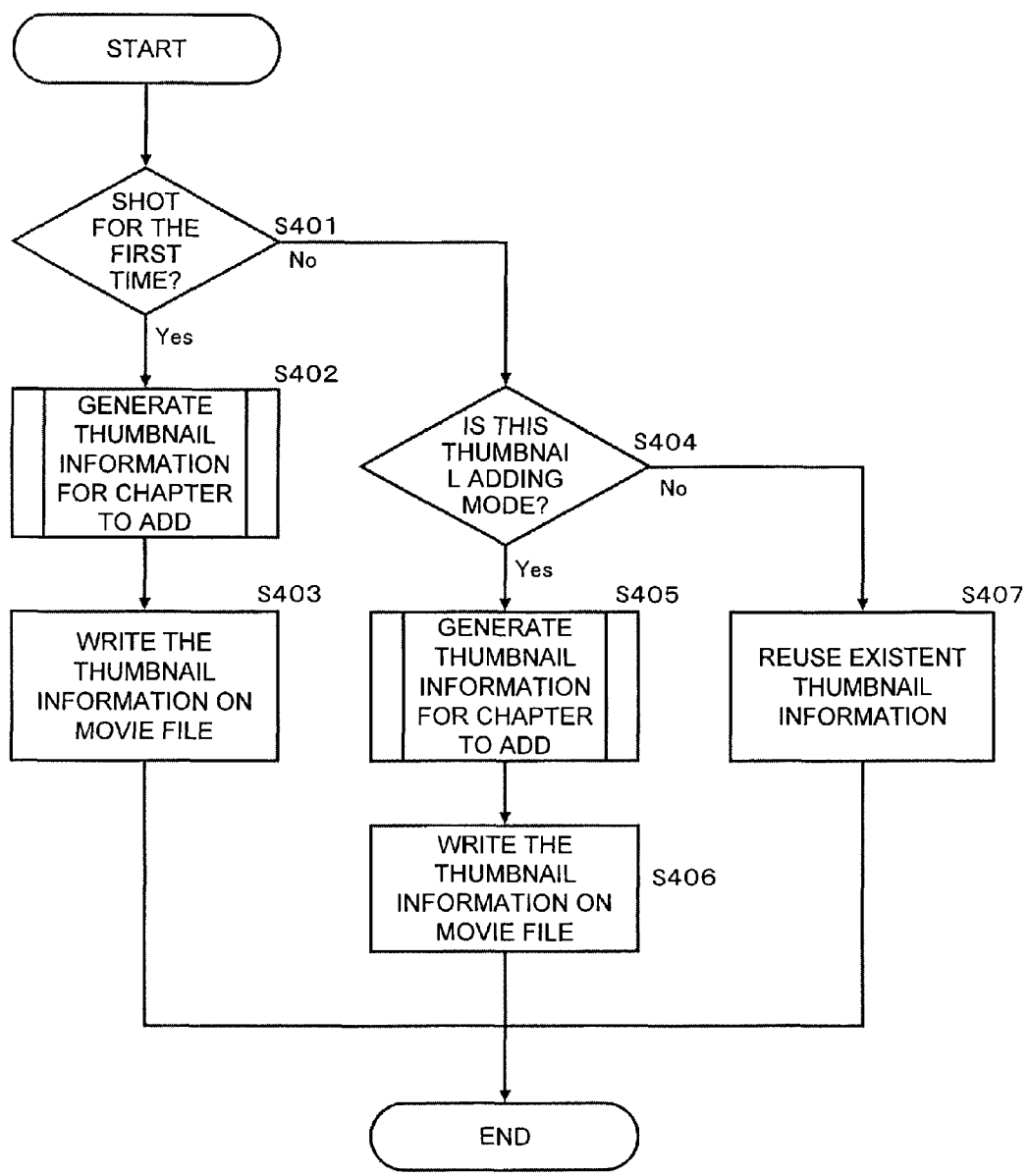
FIG. 10 is a flowchart generally showing the procedure in which the thumbnail information of a digest movie is generated or updated.

As shown in FIG. 10, the digital camera 100 of this embodiment either generates or updates thumbnail information by performing the processing step S403 of newly generating thumbnail information, the processing step S406 of adding thumbnail information, or the processing step S407 of reusing existent thumbnail information. Hereinafter, the procedure of generating or updating thumbnail information will be described step by step.

First of all, the controller 210 determines whether or not the chapter that has been written in Step S313 is the top chapter that has been added to the digest movie file (in Step S401). That is to say, the controller 210 determines whether or not a digest movie file has been created newly to add the chapter thereto (i.e., whether or not this digest movie has been shot for the first time).

If the decision has been made that this digest movie has been shot for the first time, the controller 210 generates thumbnail information about that chapter (in Step S402). Next, the controller 210 writes the thumbnail information that has been generated in Step S402 in a thumbnail information storage area as specified by the digest movie file management information (in Step S403). This processing step S402 of generating thumbnail information will be described in detail later.

On the other hand, if the decision has been made in Step S401 that this digest movie has not been shot for the first time, then the controller 210 determines whether or not the mode of operation currently set for this digital camera 100 is a thumbnail adding mode (in Step S404). The thumbnail adding mode is an effective setting when a digest movie is going to be recorded as described above, and is a mode in which two or more pieces of associated thumbnail information may be added to a single digest movie file. If the decision has been made in Step S404 that the mode of operation currently selected is not the thumbnail adding mode, then the controller 210 continues to use the existent thumbnail information as it is without newly generating thumbnail information (in Step S407). On the other hand, if the decision has been made in Step S404 that the mode of operation currently selected is the thumbnail adding mode, then the controller 210 generates thumbnail information about the chapter added as in Step S402 (in Step S405). Next, the controller 210 adds the thumbnail information that has been generated in Step S405 to a thumbnail information storage area in the management information for the digest movie file (in Step S406). That is to say, if the thumbnail adding mode has been selected as the current mode of operation, the same number of pieces of thumbnail information as that of the chapters are written in the thumbnail information storage area in the digest movie file. In this processing step, information that associates the chapters stored in the stream data storage section 78 with the thumbnail information stored in the management information storage section 70 may be written on the management information storage section 70. In this manner, the thumbnail information associated with the respective chapters that have been written on the digest movie file can be managed. And by referring to the thumbnail information, thumbnail pictures can be displayed on a chapter-by-chapter basis.

In this embodiment, those pieces of thumbnail information are supposed to be written after having been compressed on a thumbnail basis compliant with the JPEG standard. However, those pieces of thumbnail information may also be written by any other method. For example, a single set of image data including those pieces of thumbnail information may be written separately in multiple areas on the storage medium. In that case, if multiple pieces of thumbnail information are written collectively so as to be included in a single set of image data, multiple pieces of thumbnail information can be written even in a recording format in which multiple pieces of thumbnail information may not be added to a single movie file.

In the example described above, if the mode of operation currently selected is the thumbnail adding mode, thumbnail information associated with each and every chapter to be added is supposed to be written. However, the thumbnail information to be written does not have to be associated with every chapter. Alternatively, thumbnail information associated with only representative chapter(s) such as the chapter to be recorded at the top of a digest movie file may be written. Even so, the user can also see easily the outline of chapters included in a digest movie file.

Figure 11:
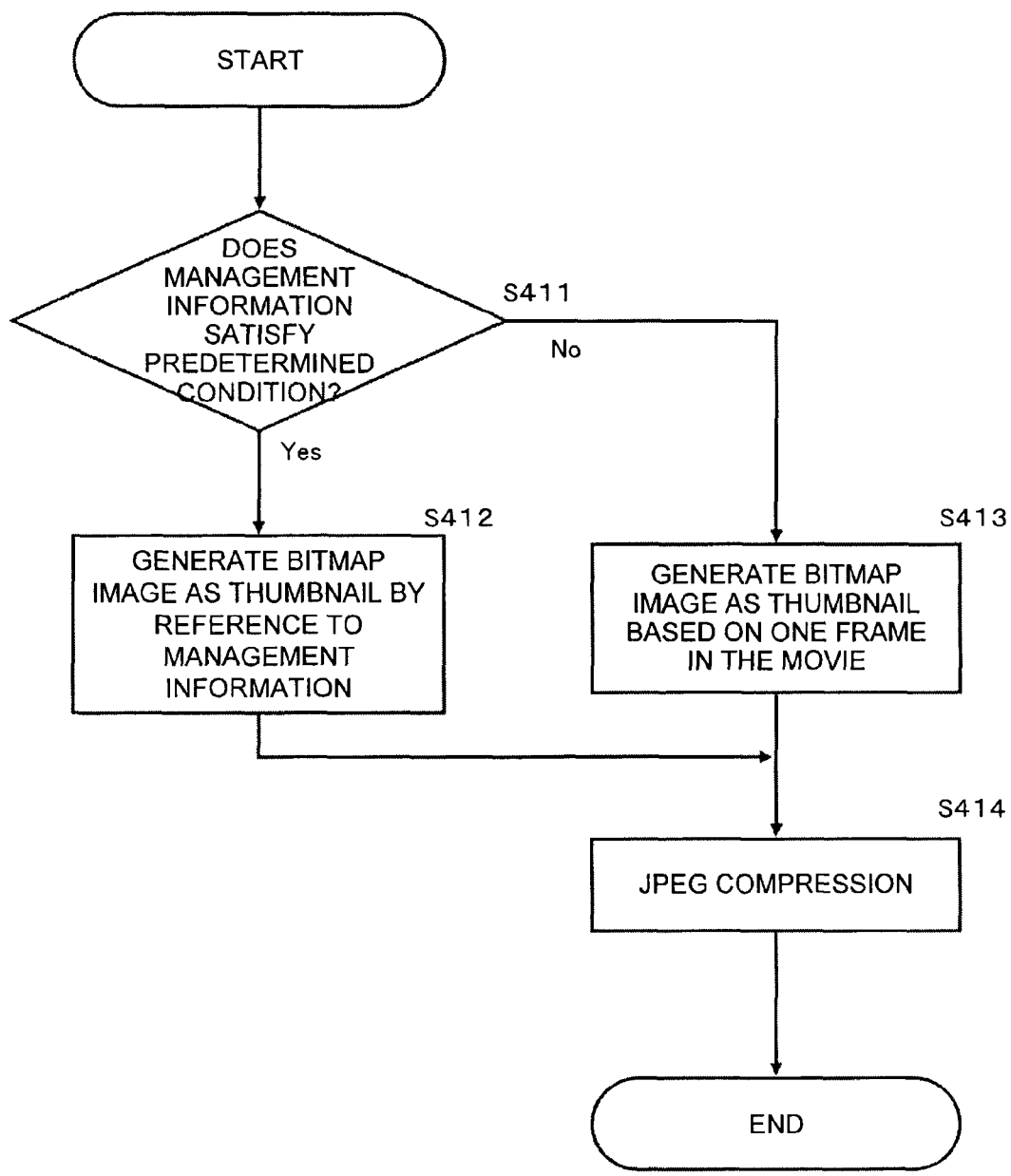
FIG. 11 is a flowchart showing a first exemplary procedure in which the thumbnail information of a digest movie is generated or updated.

Next, it will be described in detail how to generate thumbnail information in Steps S402 and S405 for a chapter newly written. FIG. 11 is a flowchart showing in detail how the digital camera 100 of this embodiment performs the processing step of generating or updating thumbnail information for a digest movie.

First of all, the controller 210 determines whether or not thumbnail information should be generated by reference to the management information that was generated when the chapter was generated (in Step S411). In this processing step, the decision whether or not to generate thumbnail information based on the management information is made by seeing if the management information satisfies a predetermined condition. The controller 210 may decide to generate thumbnail information based on the management information (1) if the management information includes user setting information indicating that thumbnail information should be made based on the management information, (2) if the management information includes information indicating that the mode of operation currently selected is Travel Mode, (3) if the management information includes information indicating that the mode of operation currently selected is Baby Mode, (4) if the management information includes information indicating that a particular subject such as the face of a person who has been added in advance by the user to the list of persons to be face-recognized is included in the chapter written, or (5) if the management information includes information indicating that the shooting location where the chapter was generated falls within a preset particular zone. It should be noted that the decision does not always have to be made on one of these conditions but may also be made on any other condition.

The Travel Mode is a mode in which a flag indicating that the user is now traveling is added to an image shot. By turning the Travel Mode ON when going on a travel and turning it OFF when coming back from the travel of his or her own will, the user can set the mode of operation of this digital camera 100 to be the Travel Mode. On the other hand, the Baby Mode is a mode in which a flag indicating that the subject is a baby is added to an image shot. When the user decides to shoot a baby, he or she may turn the Baby Mode ON and OFF of his or her own will at the start and end times of that baby's shooting session, thereby setting the mode of operation of this digital camera 100 to be the Baby Mode. Optionally, the digital camera 100 may have other modes of operations, not just the Travel Mode and the Baby Mode. The decision whether or not the mode of operation is set to be a particular mode can be made by referring to the shooting mode information in the management information shown in FIG. 7B.

If the decision has been made in Step S411 that thumbnail information should be generated by reference to the management information, then the controller 210 generates bitmap information to generate thumbnails based on any of these various sorts of information that are included in the management information.

Figure 12:
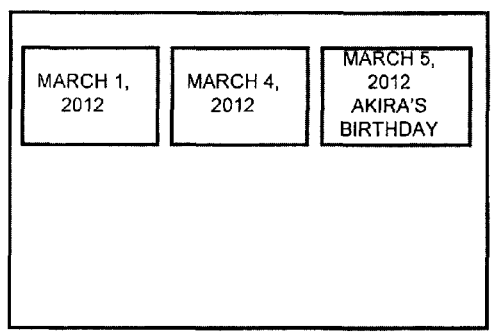
FIG. 12 illustrates examples of thumbnail pictures to be generated by reference to management information.
Figure 12:
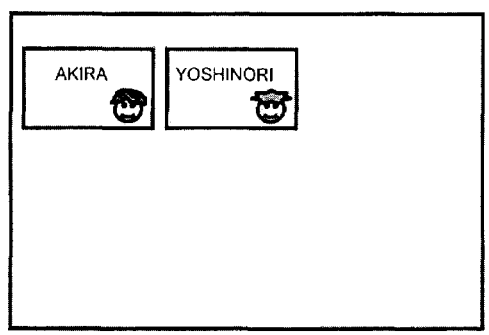
Figure 12:
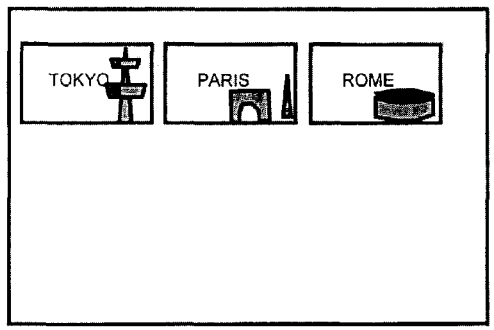
Figure 12:
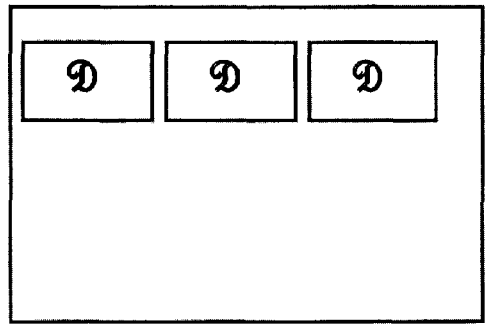

Next, some examples of thumbnail information to be generated based on management information will be described with reference to FIG. 12, which illustrates exemplary pieces of thumbnail information that have been generated by reference to the management information.

Example 1

The controller 210 may generate thumbnail information indicating the date (or the date and time) of shooting based on information about the date (or the date and time) of shooting which is included in the management information. For example, if digest movie files are recorded separately on a shooting date basis, then bitmap information including character information indicating the dates of shooting may be generated as thumbnail information as shown in FIG. 12(a). Although the left and central thumbnail pictures shown in FIG. 12(a) say only the dates indicating the dates of shooting, not only the dates but also any other kind of information obtained from calendar information such as the day of the week or the name of the holiday may be displayed as well. The calendar information may be obtained from a storage medium in the digital camera 100 or from any other telecommunications device such as a smart phone which is connected to the digital camera 100 over a network. Also, if some schedule information about a person's birthday, for example, can be obtained from the storage medium in the digital camera 100 or from any other telecommunications device such as a smart phone which is connected to the digital camera 100 over a network, the schedule information or the name of event may also be written. For example, the right thumbnail picture shown in FIG. 12(a) says not only what the date of shooting is but also that the date is a particular person's (i.e., subject's) birthday.

Example 2

The controller 210 may generate thumbnail information indicating the name of a particular subject based on information about the subject which is included in the management information. For example, if the mode of operation currently selected is Baby Mode or if a preset particular subject has been recorded in a chapter, then bitmap information including character information indicating the name of the particular subject recorded in the camera body may be generated as shown in FIG. 12(b). Also, if any other additional bitmap information such as an icon associated with the particular subject has been prepared in advance, then that additional bitmap information may also be included in the thumbnail information. Alternatively, another kind of additional bitmap information such as a still picture that has been specified in advance for a particular subject (e.g., a photo of his or her face) may also be included in the thumbnail information.

Example 3

The controller 210 may generate thumbnail information indicating the name of a particular zone based on GPS information or information indicating that the subject was shot in the particular zone, which is included in the management information. For example, if the mode of operation of this digital camera 100 is currently set to be the Travel Mode or if the decision has been made that the shooting location falls within the particular zone, bitmap information including character information indicating the name of the place may be generated as the thumbnail information as shown in FIG. 12(c). The name of the place presented may be either the name of the place that has been designated in advance by the user or the name of place that has been obtained by reference to a place name database that converts the GPS location information into the name of the place. Also, if any other additional bitmap information such as an icon associated with the particular name of place has been prepared in advance, then that additional bitmap information may also be included in the thumbnail information. Alternatively, another kind of additional bitmap information such as a still picture that has been specified in advance for a particular name of place (e.g., a photo of its famous moment) may also be included in the thumbnail information.

Example 4

The controller 210 may use a particular icon to be determined by reference to information that is included in the management information as thumbnail information. For example, if the decision has been made, by reference to the information included in the management information, that a digest movie is being recorded and that it is not appropriate to generate thumbnail information based on frame information in the movie, then bitmap information representing a particular icon that has been prepared in advance may be used as the thumbnail information as shown in FIG. 12(d). In the example illustrated in FIG. 12(d), a bitmap image "D" indicating that this is a digest movie is displayed as thumbnail information. This particular icon may have been selected by the user in advance from a number of candidate icons.

If the decision has been made, as a result of the analysis of the management information in Step S411 shown in FIG. 11, that thumbnail information should not be generated by reference to the management information, then the controller 210 generates a bitmap image as a thumbnail picture based on a single frame included in the movie data (chapter) to be processed (in Step S413). This frame may be either the first frame in the digest movie or a frame that has turned out to be the best one to make a thumbnail. The frame that should be the best to make a thumbnail may be selected from frames, of which the magnitudes of camera shake are less than a predetermined standard, and frames in which the subject to focus on is in focus to more than a standard degree.

Next, in Step S412 or S413, the controller 210 generates a bitmap image as a thumbnail picture and then subjects the bitmap image to compression processing compliant with the JPEG standard or any other appropriate standard, thereby generating thumbnail information (in Step S414).

In the example shown in FIG. 11, by analyzing the information included in the management information, the controller 210 decides whether a bitmap image should be generated as a thumbnail based on the information included in the management information or based on a frame of the movie. However, this is only an example. Alternatively, the controller 210 may always generate a bitmap image as a thumbnail picture based on the information included in the management information without performing the decision processing described above. Still alternatively, the controller 210 may also generate a bitmap image as a thumbnail picture by performing the processing shown in FIG. 13 or 14.

Figure 13:
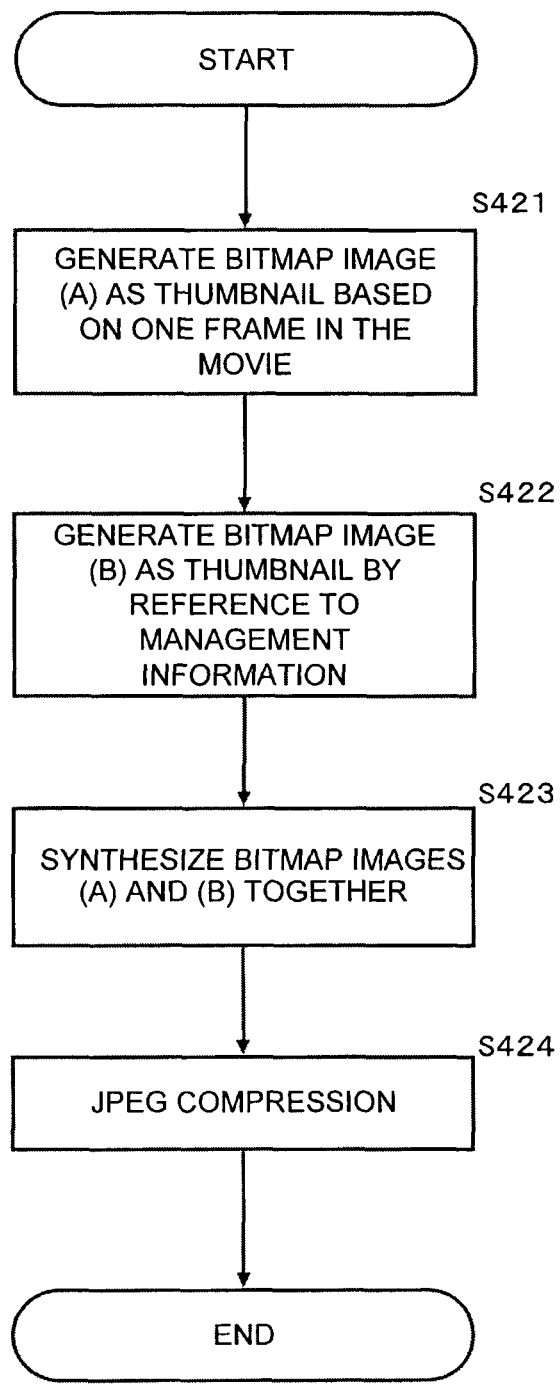
FIG. 13 is a flowchart showing a second exemplary procedure in which the thumbnail information of a digest movie is generated or updated.

FIG. 13 is a flowchart showing an exemplary procedure of generating a thumbnail picture by synthesizing together a bitmap image that is based on the information included in the management information and a single frame included in a chapter.

In this example, first of all, the controller 210 generates a bitmap image (A) based on a single frame included in a chapter (in Step S421). This processing step S421 is the same as the processing step S413 described above. Subsequently, the controller 210 generates a bitmap image (B) based on the information included in the management information (in Step S422). This processing step S422 is the same as the processing step S412 described above, and the bitmap image (B) thus generated is the same as the bitmap image that has already been described with reference to FIG. 12.

Next, the controller 210 synthesizes together the bitmap image (A) that has been generated in Step S421 and the bitmap image (B) that has been generated in Step S422 (in Step S422). These images may be synthesized together by either subdividing the thumbnail picture area into a plurality of areas and pasting the bitmap images that have been generated in Steps S421 and S422 to those subdivided areas or by cutting out a part of the bitmap image generated in Step S421 and pasting that part of the bitmap image to the bitmap image that has been generated in Step S422. Finally, the controller 210 subjects the bitmap images thus synthesized to compression processing compliant with the JPEG standard, thereby generating a thumbnail picture (in Step S424).

Figure 14:
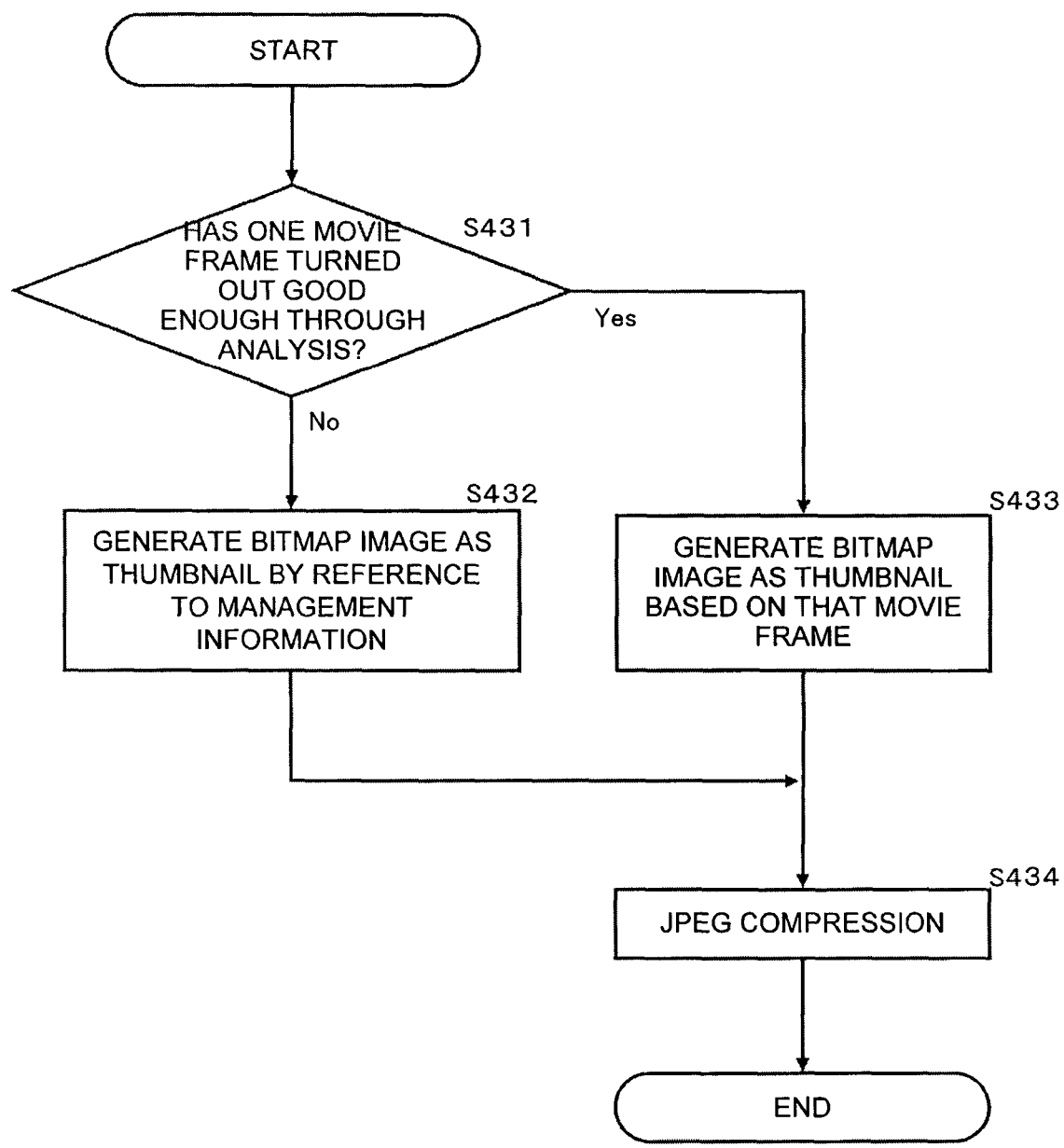
FIG. 14 is a flowchart showing a third exemplary procedure in which the thumbnail information of a digest movie is generated or updated.

FIG. 14 is a flowchart showing an exemplary procedure of determining, based on a result of an analysis of the data of a single movie frame, whether a bitmap image should be generated based on information included in the management information or based on the movie frame.

In this example, first of all, based on a result of an analysis of single frame included in a chapter, the controller 210 determines how to generate a bitmap image as a thumbnail picture (in Step S431). In this processing step, the frame to analyze may be either the first frame of that chapter or a frame that has turned out to be the best one to make a thumbnail. In Step S431, the controller 210 analyzes the frame to determine, by reference to various pieces of information indicating its image quality including its luminance, degree of motion blur, degree of out-of-focus blur, and tilt angle, whether or not that frame can be used as a thumbnail picture appropriately. For example, if the decision has been made, as a result of the analysis of that frame, that the frame lacks edges (i.e., is in out of focus or has motion blur) or that the entire frame is too dark or too bright (i.e., that the F value is not appropriate or that the user has forgot to remove the lens cap), then the controller 210 decides to generate thumbnail information based on the management information, instead of generating a thumbnail based on a frame in the chapter. Otherwise, the controller 210 decides to generate thumbnail information based on the frame analyzed.

If the controller 210 has decided to generate thumbnail information based on the management information, the controller 210 generates a bitmap image as a thumbnail based on the information included in the management information (in Step S432). This processing step S432 may be the same as the processing step S412 described above. On the other hand, if the controller 210 has decided to generate thumbnail information based on a single frame in the movie data, the controller 210 generates a bitmap image as a thumbnail based on the single frame in the movie data (in Step S433). This processing step S433 may be the same as the processing step S413 described above. After having generated a bitmap image in Step S432 or S433, the controller 210 subjects the bitmap image to compression processing compliant with the JPEG standard, thereby generating thumbnail information (in Step S434).

Optionally, the processing shown in FIG. 11 may be combined with the processing shown in FIG. 14. That is to say, the decision whether thumbnail information should be generated by reference to the management information may be made by determining whether or not the management information satisfies a predetermined condition and by seeing if the result of analysis of a single frame in the movie is good or bad.

As can be seen from the foregoing description, the digital camera 100 of this embodiment generates thumbnail information based on information included in the management information that is associated with respective chapters that form a digest movie. And the digital camera 100 stores the thumbnail information thus generated in the digest movie file in association with its associated chapters. In this manner, more convenient thumbnail information can be generated and written for the user.

The method of generating and writing thumbnail information according to this embodiment is applicable particularly effectively to a digital camera that does not have a dedicated digest movie shooting mode but that has an optional function of shooting a digest movie while shooting a still picture in a normal mode. When shooting a digest movie while shooting a still picture in a normal mode, the digital camera is designed so as to shoot the still picture optimally. That is why if a digest movie has been shot while a still picture is being shot in a normal mode, not every chapter included in the digest movie file will have content suitable for viewing. For that reason, if a thumbnail picture is simply generated based on frames that form such a chapter, there will be every chance that the user cannot understand the content of the digest movie easily.

In contrast, the digital camera 100 of this embodiment generates a thumbnail picture representing a digest movie based on information included in the management information. For example, if the management information includes information indicating that a particular subject has been shot, then the digital camera 100 generates thumbnail information using character information such as the name of that subject that has been added to the list in advance. As a result, while viewing a thumbnail picture representing a digest movie, the user can understand the content of that digest movie more easily.

[1-2-5. Display of Thumbnail Information]

Figure 15:
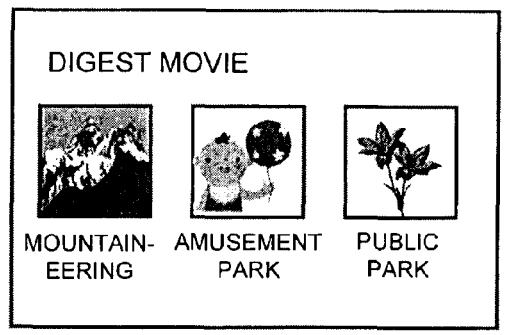
FIG. 15 illustrates exemplary thumbnail pictures to be displayed during playback.
Figure 15:
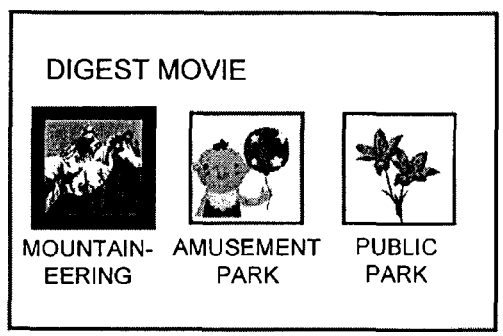
Figure 15:
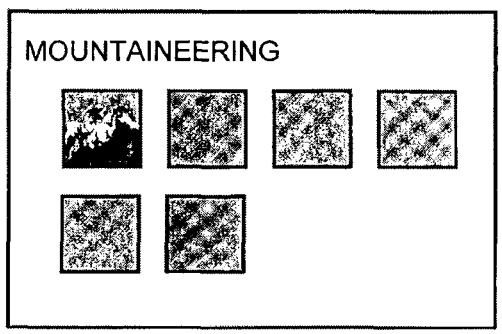
Figure 15:
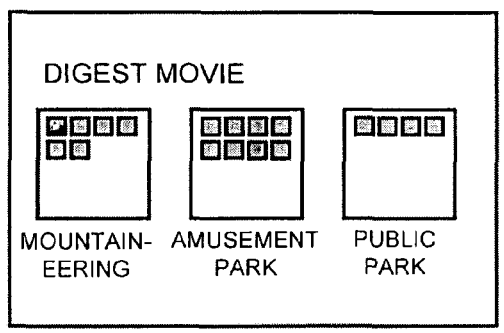

Next, it will be described with reference to FIG. 15 how thumbnails may be displayed when a digest movie that has been shot while setting the thumbnail adding mode is played back. FIG. 15 illustrates how thumbnails are displayed during a playback. In the following description, three exemplary sets of thumbnails to be displayed will be described with reference to FIGS. 15(*a*) through 15(*c*).

FIG. 15(*a*) illustrates an exemplary set of thumbnails to be displayed initially on the screen when the modes of operation are changed into the playback mode. The controller 210 gets an image representing the first one of multiple pieces of thumbnail information that are stored in each digest movie file displayed on the LCD monitor 204. If a thumbnail picture representing a particular digest movie file has been selected by the user, thumbnail pictures representing multiple chapters that are included in the digest movie file selected are sequentially displayed one after another at regular intervals from the first one. As a result, those thumbnail pictures representing the multiple chapters that are included in the digest movie file can be presented as a slide show. And the user can easily understand the outline of those chapters that are included in that file with such presentation.

In the example shown in FIG. 15(b1), the controller 210 gets a thumbnail picture representing the first one of multiple pieces of thumbnail information that are stored in each digest movie file displayed as a thumbnail picture representing each digest movie on the LCD monitor 204 as in the example shown in FIG. 15(a). If a thumbnail picture representing a particular digest movie file has been selected by the user, the controller 210 changes the display modes of the LCD monitor 204 into a one in which multiple thumbnail pictures that are included in the digest movie file selected are displayed as a list as shown in FIG. 15(b2). As a result, the user can view a list of thumbnail pictures representing the thumbnail information that is included in the digest movie file, and therefore, can easily understand the outline of the chapters that are included in the digest movie file.

In the example shown in FIG. 15(c), the controller 210 gets a thumbnail picture representing a part or all of the thumbnail information that is included in each digest movie file displayed as a single thumbnail picture on the LCD monitor 204. As a result, the user can easily understand the contents of multiple chapters that are included in each digest movie file by looking at a single picture.

[1-3. Effects]

As can be seen from the foregoing description, a digital camera (image capture device) 100 according to this embodiment includes: an image capturing section 264 which is configured to generate and output captured image data in response to a shooting instruction; an image processing section 203 which is configured to generate movie data (chapters) based on the captured image data; and a controller 210 which is configured to generate a representative picture representing the movie data by reference to management information which is associated with the movie data and which does not include a representative picture representing the movie data. The digital camera 100 can also be said to include an image processing apparatus comprising: an interface (e.g., a connection terminal between the controller 210 and the image processing section 203) which is configured to obtain management information that has been generated along with movie data generated; and a controller 210 which is configured to generate a representative picture representing the movie data by reference to the management information. Consequently, a more convenient representative picture can be generated for the user.

Particularly, the controller 210 may generate a representative picture by reference to the management information without using any frame data included in the movie data. As a result, an easily sensible representative picture which is quite different from the frames included in the movie data can be generated.

In another embodiment, the controller 210 may also generate, as the representative picture, image information including characters to be determined by the management information. According to such an embodiment, a convenient representative picture which allows the user to quickly understand the contents of the movie data by reference to the character information can be generated.

In still another embodiment, the management information includes information specifying a shooting condition which is generated when movie data is generated and on which the captured image data is obtained. According to such an embodiment, a convenient representative picture can be generated according to the shooting condition.

In yet another embodiment, the controller 210 is configured to write the representative picture generated on a storage medium in association with the movie data. According to such an embodiment, when movie data is played back, its associated representative picture can be accessed easily.

In yet another embodiment, the movie data and the management information are stored in a single movie file, and the controller 210 is configured to update the movie file by storing, in the movie file, the representative picture that has been generated by reference to the management information. According to such an embodiment, the management information can be managed in association with the movie data.

In yet another embodiment, if the management information includes information indicating a shooting mode when the captured image data was obtained, the controller 210 can generate, by reference to the information indicating the shooting mode, a representative picture including information about the shooting mode. According to such an embodiment, a convenient representative picture can be generated according to the shooting mode.

In yet another embodiment, if the management information includes information indicating a date and time when the captured image data was obtained, the controller 210 can generate, by reference to the information indicating the date and time, a representative picture including the information about the date and time. In a specific embodiment, the information about the date and time is image information including characters indicating the date or the date and time when the movie data was generated. According to such an embodiment, a convenient thumbnail which allows the user to easily confirm the date of shooting a moving picture can be generated.

In yet another embodiment, if the management information includes information revealing the identity of a subject included in the movie data, the controller 210 can generate, by reference to the information revealing the identity of the subject, a representative picture including information symbolizing the subject. In a specific embodiment, the information symbolizing the subject is image information including at least one of characters, an icon and a photograph revealing the identity of the subject. According to such an embodiment, a convenient representative picture which allows the user to easily recognize the subject in the moving picture can be generated.

In yet another embodiment, if the management information includes information indicating a place where the movie data was generated, the controller 210 can generate, by reference to the information indicating the place, a representative picture including information symbolizing the place. In a specific embodiment, the information symbolizing the place is image information including at least one of characters, an icon and a photograph indicating the place. According to such an embodiment, a convenient thumbnail which allows the user to easily determine the place where the moving picture was shot can be generated.

In yet another embodiment, if the interface obtains both the movie data and the management information, the controller 210 analyzes at least one of the management information and the movie data to determine whether the representative picture is to be generated either based on frame data included in the movie data or by reference to the management information without using any frame data included in the movie data. According to such an embodiment, thumbnails can be generated flexibly. For example, if it is not appropriate to generate a representative picture based on a frame, a representative picture may be generated by reference to the management information.

Also, according to this embodiment, the image processing section 203 generates not only movie data based on captured image data that has been generated in response to an instruction to shoot a still picture but also still picture data in response to that shooting instruction. As a result, chapters of a digest movie can be generated in response to an instruction to shoot a still picture as a trigger.

Furthermore, the digital camera 100 of this embodiment further includes an image capturing section which generates captured image data by capturing a subject image. The controller 210 generates not only still picture data based on the captured image data generated in response to an instruction to shoot a still picture from the user but also movie data based on the captured image data that has been generated before and/or after the timing of accepting the instruction to shoot a still picture. As a result, a convenient digest movie can be generated, along with a representative picture, synchronously with the timing of accepting the instruction to shoot a still picture.

Embodiment 2

The first embodiment described above is a method for generating thumbnail information in a situation where a digest movie is being recorded. On the other hand, a second embodiment to be described below is a method for generating thumbnail information in a situation where a normal movie, other than a digest movie, is being recorded.

[2-1. Configuration]

The digital camera of this embodiment has the same electrical configuration as that of the digital camera 100 of the first embodiment that has already been described with reference to FIGS. 1 through 3, and description thereof will be omitted herein. Also, since their configurations are the same, each component of the digital camera of this embodiment having substantially the same function as its counterpart of the first embodiment will be identified by the same reference numeral as that counterpart's.

Likewise, the ordinary movie file has substantially the same format as the digest movie file shown in FIG. 7B except that the stream data storage section 78 has no storage area that is subdivided on a chapter by chapter basis.

[2-2. Operation]

Figure 16:
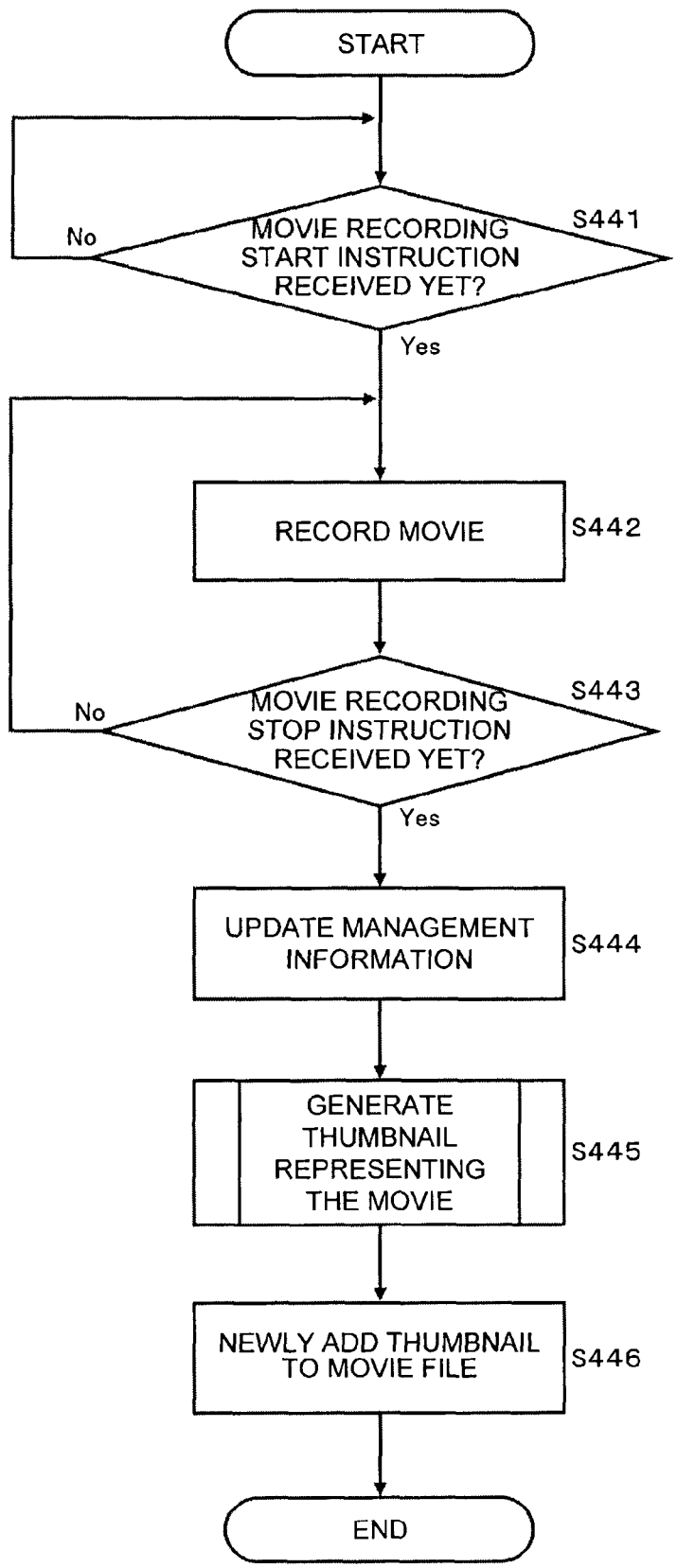
FIG. 16 is a flowchart showing a general procedure in which thumbnail information is generated while an ordinary movie is being recorded according to a second exemplary embodiment.

Hereinafter, it will be described with reference to FIG. 16 how the digital camera 100 of this embodiment records an ordinary movie. FIG. 16 is a flowchart showing the procedure of the operation of recording an ordinary movie.

First of all, the controller 210 waits for an instruction to start recording a movie (which will be referred to herein as a "movie recording start instruction") (in Step S441). The movie recording start instruction may be issued by having a movie recording button included in the operating section 223 pressed by the user, for example. On receiving the movie recording start instruction, the controller 210 starts a movie recording operation (in Step S442). In response, the controller 210 newly creates a movie file in the memory card 221 and stores (i.e., writes) movie data in the stream data storage section of the movie file.

Subsequently, the controller 210 waits for an instruction to stop recording the movie (which will be referred to herein as a "movie recording stop instruction") (in Step S443). The movie recording stop instruction may also be issued by having the same movie recording button included in the operating section 223 pressed by the user, for example. The controller 210 continues the processing step S442 of recording the movie until the controller 210 receives the movie recording stop instruction. And on receiving the movie recording stop instruction in Step S443, the controller finishes 210 the movie recording operation.

After having finished the movie recording operation, the controller 210 updates the management information in the movie file recorded (in Step S444). In this processing step, the controller 210 writes all of the management information that is stored in the management information storage section of the movie file but the thumbnail information. Examples of the management information to write include the running time, video and audio recording format information, and shooting information such as the date and time of shooting, an F value, a shutter speed, sensitivity, GPS information, information about the shooting mode, and information indicating whether a particular subject is included or not.

Subsequently, the controller 210 generates thumbnail information about the movie that has been shot (in Step S445). This thumbnail information is bitmap information to be stored in the thumbnail information storage area in the management information storage section of a movie file. The controller 210 adds information representing the bitmap image thus generated to the thumbnail information storage area in the movie file created (in Step S446).

The processing step S445 of generating thumbnail information may be performed in the procedure shown in FIG. 11, 13 or 14 that has already been described for the first embodiment.

As can be seen from the foregoing description, the digital camera 100 of this embodiment generates thumbnail information based on information to be included in the management information associated with movie data that has been generated while an ordinary movie is being shot. And the digital camera 100 stores the thumbnail information generated in the file of the movie shot in association with the movie file. As a result, even when an ordinary movie is shot, more convenient thumbnail information can be generated and written for the user.

Other Embodiments

Although Embodiments 1 and 2 have been described herein as just examples of the technique of the present disclosure, various modifications, replacements, additions or omissions can be readily made on those embodiments as needed and the present disclosure is intended to cover all of those variations. Also, a new embodiment can also be created by combining respective elements that have been described for those embodiments disclosed herein.

Thus, some other embodiments will be described.

In the embodiments described above, the management information is supposed to be stored in a still picture file, a movie file and a digest movie file. However, the management information may also be stored in another file independently of these files. For example, the management information may be managed in association with the respective contents of the management database shown in FIG. 7A. Also, the information included in the management information shown in FIG. 7B is only an example and may include pieces of information other than the ones shown in FIG. 7B and may not have some of the pieces of information shown in FIG. 7B.

The technique of the present disclosure is applicable to not just an image capture device such as the digital camera 100 but also any other computer (image processing apparatus) with the functions of the controller 210 as well. Such an image processing apparatus may have the same configuration as the controller 210 shown in FIG. 3, for example, and may operate as shown in FIGS. 8 to 11, 13, 14 and 16. That image processing apparatus includes an interface which is configured to obtain management information that has been generated along with movie data generated; and a controller which is configured to generate a representative picture representing the movie data by reference to the management information.

That image processing apparatus may obtain later either movie data that has been generated with an image capture device and written on a storage medium or movie data to be transmitted over telecommunications lines and may generate a representative picture by subjecting the movie data to the processing described above. The image processing apparatus may further be a personal computer or a server computer that provides a crowd service.

Optionally, the technique of the present disclosure is applicable to not only movie data that has been generated based on captured image data obtained by shooting but also movie (such as animation) data that has been generated by a method other than shooting. A convenient representative picture representing movie data generated by a non-shooting method can be generated by reference to management information that was generated when the movie data was generated.

The technique of the present disclosure is also applicable to software (computer program) that defines the processing described above. The operation defined by such a program is as shown in FIGS. 8 to 11, 13, 14 and 16, for example. Such a program may be distributed by being stored in a removable storage medium and may also be downloaded over telecommunications lines. By making a processor built in a computer execute such a program, the various operations of the embodiments described above can be carried out.

Various embodiments have been described as examples of the technique of the present disclosure by providing the accompanying drawings and a detailed description for that purpose.

That is why the elements illustrated on those drawings and/or mentioned in the foregoing description include not only essential elements that need to be used to overcome the problems described above but also other inessential elements that do not have to be used to overcome those problems but are just mentioned or illustrated to give an example of the technique of the present disclosure. Therefore, please do not make a superficial decision that those inessential additional elements are indispensable ones simply because they are illustrated or mentioned on the drawings or the description.

Also, the embodiments disclosed herein are just an example of the technique of the present disclosure, and therefore, can be subjected to various modifications, replacements, additions or omissions as long as those variations fall within the scope of the present disclosure as defined by the appended claims and can be called equivalents.

The technique of the present disclosure is implementable as not only the digital camera 100 but also any other kind of image capture device such as a movie camera, a cellphone with camera, a wearable camera or a surveillance camera or an information processing apparatus such as a personal computer or a server computer.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An image processing apparatus comprising:
   an interface configured to obtain management information that has been generated along with movie data generated; and
   a controller configured to generate a representative picture representing the movie data, the representative picture including text characters or an icon to be determined by reference to the management information,
   wherein when selected by a user, the representative picture is presented on a display device in order to start playing back movie data represented by the representative picture, and
   wherein the controller is configured to generate the representative picture by reference to the management information without using any frame data included in the movie data based on the management information satisfying a predetermined condition.

2. The image processing apparatus of claim 1, wherein the controller is configured to write the representative picture generated on a storage medium in association with the movie data.

3. The image processing apparatus of claim 1, wherein the controller is configured to generate the representative picture including text characters to be determined by the management information.

4. The image processing apparatus of claim 1, wherein the movie data is generated based on captured image data that has been obtained by shooting,
   the management information includes information specifying a shooting condition on which the captured image data is obtained, and
   the controller is configured to generate the representative picture representing the movie data by reference to the information specifying the shooting condition.

5. The image processing apparatus of claim 1, further comprising an image capturing section configured to capture a subject image and generates captured image data,
   wherein the controller is configured to generate still picture data based on the captured image data that has been generated in accordance with a user's instruction to shoot a still picture and to generate the movie data based on captured image data that has been generated before and/or after a timing to instruct to shoot the still picture.

6. The image processing apparatus of claim 1, wherein the management information does not include the representative picture representing the movie data.

7. The image processing apparatus of claim 1, wherein the movie data and the management information are stored in a single movie file, and
   the controller is configured to update the movie file by storing, in the movie file, the representative picture that has been generated by reference to the management information.

8. The image processing apparatus of claim 1, wherein if the management information includes information indicating a shooting mode when the movie data was generated,
   the controller is configured to generate, by reference to the information indicating the shooting mode, the representative picture including information that has been set in advance according to the shooting mode.

9. The image processing apparatus of claim 1, wherein when the management information includes information indicating a date and time when the movie data was generated, the controller is configured to generate, by reference to the information indicating the date and time, the representative picture including the information about the date and time.

10. The image processing apparatus of claim 9, wherein the representative picture includes text characters indicating the date or the date and time when the movie data was generated.

11. The image processing apparatus of claim 1, wherein when the management information includes information revealing the identity of a subject included in the movie data,
the controller is configured to generate, by reference to the information revealing the identity of the subject, the representative picture including information symbolizing the subject.

12. The image processing apparatus of claim 11, wherein the representative picture includes at least one of text characters, an icon and a photograph revealing the identity of the subject.

13. The image processing apparatus of claim 1, wherein when the management information includes information indicating a place where the movie data was generated,
the controller is configured to generate, by reference to the information indicating the place, the representative picture including information symbolizing the place.

14. The image processing apparatus of claim 13, wherein the representative picture includes at least one of text characters, an icon and a photograph indicating the place.

15. The image processing apparatus of claim 1, wherein the interface is configured to obtain both the movie data and the management information, and
the controller is configured to analyze at least one of the management information and the movie data to determine whether the representative picture is to be generated either based on frame data included in the movie data or by reference to the management information without using any frame data included in the movie data.

16. A computer program, stored on a non-transitory computer readable storage medium, that is defined to make a computer perform the steps of:
obtaining management information that is associated with movie data and which has been generated along with the movie data generated; and
generating a representative picture representing the movie data by reference to the management information,
wherein when selected by a user, the representative picture is presented on a display device in order to start playing back movie data represented by the representative picture, and
wherein the representative picture is generated by reference to the management information without using any frame data included in the movie data based on the management information satisfying predetermined condition.

* * * * *